US012647620B2

(12) United States Patent
Tan et al.

(10) Patent No.: US 12,647,620 B2
(45) Date of Patent: Jun. 2, 2026

(54) IMAGE ENCODING/DECODING METHOD, METHOD FOR TRANSMITTING BITSTREAM, AND RECORDING MEDIUM FOR STORING BITSTREAM

(71) Applicant: LG Electronics Inc., Seoul (KR)

(72) Inventors: Hendry Tan, Seoul (KR); Jung Hak Nam, Seoul (KR); Hyeong Moon Jang, Seoul (KR); Jaehyun Lim, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 19/173,389

(22) Filed: Apr. 8, 2025

(65) Prior Publication Data

US 2025/0240457 A1     Jul. 24, 2025

Related U.S. Application Data

(63) Continuation of application No. PCT/KR2023/021886, filed on Dec. 28, 2023.

(Continued)

(51) Int. Cl.
*H04N 19/80* (2014.01)
*H04N 19/117* (2014.01)
(Continued)

(52) U.S. Cl.
CPC ........... *H04N 19/80* (2014.11); *H04N 19/117* (2014.11); *H04N 19/172* (2014.11); *H04N 19/70* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 2020/0029096 A1* | 1/2020 | Rusanovskyy | ........ H04N 19/52 |
| 2021/0099710 A1 | 4/2021 | Salehifar et al. | |
| 2024/0089510 A1* | 3/2024 | Deshpande | ............ H04N 19/70 |

FOREIGN PATENT DOCUMENTS

| | | |
|---|---|---|
| KR | 10-1132386 B1 | 7/2012 |
| KR | 10-1789370 B1 | 10/2017 |
| KR | 10-2021-0034536 A | 3/2021 |

OTHER PUBLICATIONS

Wang, "AHG9: A summary of proposals on NNPF SEI messages" Joint Video Experts Team (JVET) of ITU-T SG 16 WP 3 and ISO/IEC JTC 1/SC 29, 28th Meeting, Mainz, DE, Oct. 20-28, 2022, JVET-AB0193-v2, pp. 14. (Year: 2022).*

(Continued)

*Primary Examiner* — Stuart D Bennett
(74) *Attorney, Agent, or Firm* — Fish & Richardson P.C.

(57) ABSTRACT

An image encoding/decoding method, a method of transmitting a bitstream and a recording medium storing a bitstream are provided. The image decoding method may comprise receiving a neural-network post-filter (NNPF) related supplemental enhancement information (SEI) message to be applied to a current picture, reconstructing NNPF related information based on the NNPF related SEI message, and applying an NNPF to the current picture based on the NNPF related information. The NNPF related SEI message may include a neural-network post-filter characteristics (NNPFC) SEI message including filter identification information and filter property present information, and the NNPFC SEI message may further include base filter present information specifying whether the NNPFC SEI message includes a base neural-network post-processing filter.

12 Claims, 9 Drawing Sheets

Related U.S. Application Data

(60) Provisional application No. 63/439,587, filed on Jan. 18, 2023, provisional application No. 63/436,624, filed on Jan. 1, 2023.

(51) Int. Cl.
| | |
|---|---|
| *H04N 19/172* | (2014.01) |
| *H04N 19/70* | (2014.01) |
| *H04N 19/85* | (2014.01) |

(56) References Cited

OTHER PUBLICATIONS

McCarthy et al., "AHG9: Specification text for use of Rec. ITU-T T.35 syntax structure to specify a neural network in the neural-network post filter characteristics SEI message," JVET-AB0266-v2, Joint Video Experts Team (JVET) of ITU-T SG 16 WP 3 and ISO/IEC JTC 1/SC 29, 28th Meeting, Mainz, DE, Oct. 20-28, 2022, 17 pages.

* cited by examiner

FIG. 3

IMAGE ENCODING/DECODING METHOD, METHOD FOR TRANSMITTING BITSTREAM, AND RECORDING MEDIUM FOR STORING BITSTREAM

CROSS-REFERENCE TO RELATED APPLICATIONS

This application is a continuation of International Application No. PCT/KR2023/021886, filed on Dec. 28, 2023, which claims the benefit of U.S. Provisional Application No. 63/439,587, filed on Jan. 18, 2023, and 63/436,624, filed on Jan. 1, 2023. The disclosures of the prior applications are incorporated by reference in their entirety.

TECHNICAL FIELD

The present disclosure relates to an image encoding/decoding method, a method of transmitting a bitstream and a recording medium storing a bitstream, and, more particularly, to a method of processing a neural-network post-filter.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

In addition, an object of the present disclosure is to provide an image encoding/decoding method and apparatus, which can specify a point in time at which an updated neural-network post-processing filter is applied.

In addition, an object of the present disclosure is to provide an image encoding/decoding method and apparatus, which can omit signaling of filter property present information.

In addition, an object of the present disclosure is to provide an image encoding/decoding method and apparatus that efficiently signals whether a filter property is present and whether a base filter is present.

In addition, an object of the present disclosure is to provide an image encoding/decoding method and apparatus in which an NNPFC SEI message including a base neural-network post-processing filter can be repeated.

In addition, an object of the present disclosure is to provide an image encoding/decoding method and apparatus, in which a repeated NNPFC SEI message has the same content as a first NNPFC SEI message, in decoding order, having the same filter identification information (e.g., nnpf-c_id) value within a current CLVS.

In addition, an object of the present disclosure is to provide an image encoding/decoding method and apparatus that efficiently signals base filter present information.

In addition, an object of the present disclosure is to provide a non-transitory computer-readable recording medium storing a bitstream generated by an image encoding method according to the present disclosure.

In addition, an object of the present disclosure is to provide a non-transitory computer-readable recording medium storing a bitstream received, decoded and used to reconstruct an image by an image decoding apparatus according to the present disclosure.

In addition, an object of the present disclosure is to provide a method of transmitting a bitstream generated by an image encoding method according to the present disclosure.

The technical problems solved by the present disclosure are not limited to the above technical problems and other technical problems which are not described herein will become apparent to those skilled in the art from the following description.

An image decoding method according to an aspect of the present disclosure may be performed by an image decoding apparatus and may comprise receiving a neural-network post-filter (NNPF) related supplemental enhancement information (SEI) message to be applied to a current picture, reconstructing NNPF related information based on the NNPF related SEI message, and applying an NNPF to the current picture based on the NNPF related information. In the image decoding method according to the present disclosure, the NNPF related SEI message may include a neural-network post-filter characteristics (NNPFC) SEI message including filter identification information and filter property present information, and the NNPFC SEI message may further include base filter present information specifying whether the NNPFC SEI message includes a base neural-network post-processing filter.

An image encoding method according to another aspect of the present disclosure may be performed by an image encoding apparatus, and may comprise generating neural-network post-filter (NNPF) related information to be applied to a current picture and generating an NNPF related supplemental enhancement information (SEI) message based on the NNPF related information.

In the image encoding method according to the present disclosure, the NNPF related SEI message may include a neural-network post-filter characteristics (NNPFC) SEI message including filter identification information and filter property present information, and the NNPFC SEI message may further include base filter present information specifying whether the NNPFC SEI message includes a base neural-network post-processing filter.

A computer-readable recording medium according to another aspect of the present disclosure can store a bitstream generated by the image encoding method or apparatus of the present disclosure.

A transmission method according to another aspect of the present disclosure may transmit a bitstream generated by the image encoding method or apparatus of the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

Also, according to the present disclosure, it is possible to provide an image encoding/decoding method and apparatus, which can specify a point in time at which an updated neural-network post-processing filter is applied.

Also, according to the present disclosure, it is possible to provide an image encoding/decoding method and apparatus, which can omit signaling of filter property present information.

Also, according to the present disclosure, it is possible to provide an image encoding/decoding method and apparatus that efficiently signals whether a filter property is present and whether a base filter is present.

Also, according to the present disclosure, it is possible to provide an image encoding/decoding method and apparatus in which an NNPFC SEI message including a base neural-network post-processing filter can be repeated.

Also, according to the present disclosure, it is possible to provide an image encoding/decoding method and apparatus, in which a repeated NNPFC SEI message has the same content as a first NNPFC SEI message, in decoding order, having the same filter identification information value within a current CLVS.

Also, according to the present disclosure, it is possible to provide an image encoding/decoding method and apparatus that efficiently signals base filter present information.

Also, according to the present disclosure, it is possible to provide a non-transitory computer-readable recording medium storing a bitstream generated by an image encoding method according to the present disclosure.

Also, according to the present disclosure, it is possible to provide a non-transitory computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 3 is a view schematically showing an image decoding apparatus, to which an embodiment of the present disclosure is applicable.

DETAILED DESCRIPTION

Figure 1:
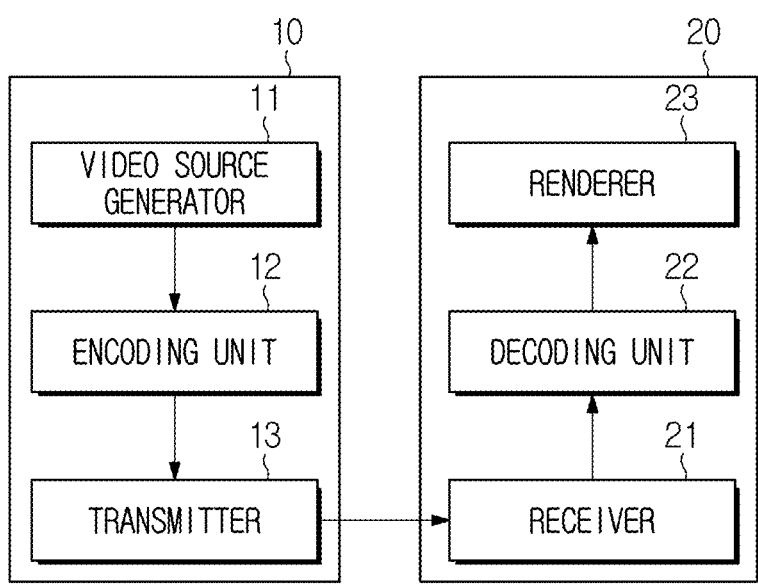
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system to which an embodiment of the present disclosure is applicable.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit (encoder) 12 and a transmitter 13. The decoding apparatus 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a transmission device separate from the encoding apparatus 12, and in this case, the transmission device may include at least one processor that acquires encoded video/image information or data output in the form of a bitstream and a transmission unit for transmitting it in the form of a file or streaming. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
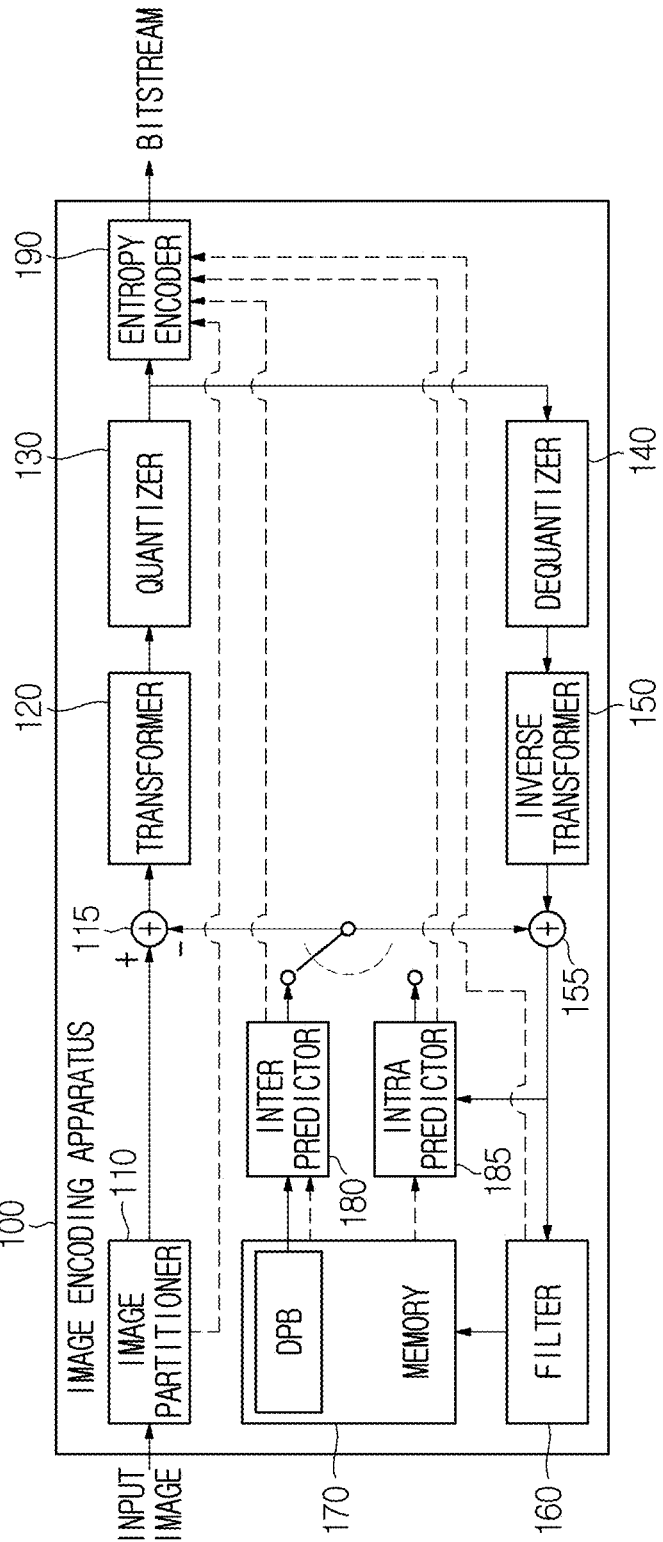
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit (intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit (inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different.

The temporal neighboring block may be called a collocated reference block, a co-located CU (colCU), and the like. The reference picture including the temporal neighboring block may be called a collocated picture (colPic). For example, the inter prediction unit 180 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
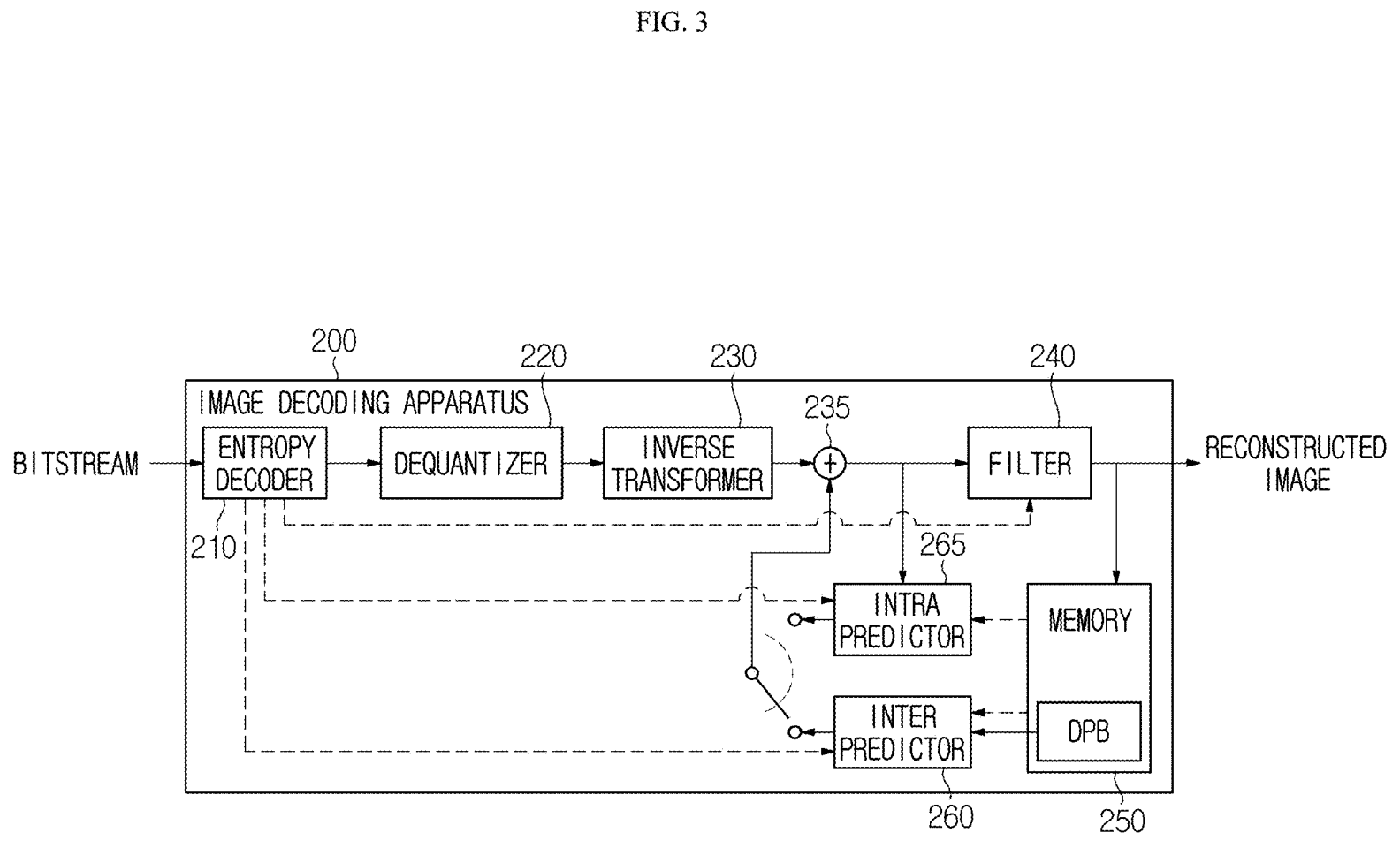

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor (inter prediction unit) 260 and the intra predictor (intra prediction unit) 265 may be collectively referred to as a "prediction unit (predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Neural-Network Post-Filter Characteristics (NNPFC)

A combinations of Table 1 and Table 2 represent an NNPFC syntax structure.

TABLE 1

| nn_post_filter_characteristics( payloadSize ) { | Descriptor |
|---|---|
| nnpfc_id | ue(v) |
| nnpfc_mode_idc | ue(v) |
| if( nnpfc_mode_idc = = 1 ) { | |
| while( !byte_aligned( ) ) | |
| nnpfc_reserved_zero_bit_a | u(1) |
| nnpfc_tag_uri | st(v) |
| nnpfc_uri | st(v) |
| } | |
| nnpfc_formatting_and_purpose_flag | u(1) |
| if( nnpfc_formatting_and_purpose_flag ) { | |
| nnpfc_purpose | ue(v) |
| /* input and output formatting */ | |
| if( nnpfc_purpose = = 2 \|\| nnpfc_purpose = = 4 ) | |
| nnpfc_out_sub_c_flag | u(1) |
| else if( nnpfc_purpose = = 3 \| \| nnpfc_purpose = = 4 ) { | |
| nnpfc_pic_width_in_luma_samples | ue(v) |
| nnpfc_pic_height_in_luma_samples | ue(v) |
| } | |
| else if( nnpfc_purpose = = 5 ) { | |
| nnpfc_num_input_pics_minus2 | ue(v) |
| for( i = 0; i <= nnpfc_num_input_pics_minus2; i++ ) | |
| nnpfc_interpolated_pics[ i ] | ue(v) |
| } | |
| nnpfc_component_last_flag | u(1) |
| nnpfc_inp_format_idc | ue(v) |
| if( nnpfc_inp_format_idc = = 1 ) | |
| nnpfc_inp_tensor_bitdepth_minus8 | ue(v) |
| nnpfc_imp_order_idc | ue(v) |
| nnpfc_auxiliary_inp_idc | ue(v) |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| nnpfc_matrix_coeffs | u(8) |
| } | |
| nnpfc_out_format idc | ue(v) |
| if( nnpfc_out_format_idc = = 1 ) | |
| nnpfc_out_tensor_bitdepth_minus8 | ue(v) |

TABLE 2

| nnpfc_out_order_idc | ue(v) |
|---|---|
| nnpfc_constant_patch_size_flag | u(1) |
| nnpfc_patch_width_minus1 | ue(v) |
| nnpfc_patch_height_minus1 | ue(v) |

TABLE 2-continued

| nnpfc_overlap | ue(v) |
|---|---|
| nnpfc_padding_type | ue(v) |
| if( nnpfc_padding_type = = 4 ) { | |
| nnpfc_luma_padding_val | ue(v) |
| nnpfc_cb_padding_val | ue(v) |
| nnpfc_cr_padding_val | ue(v) |
| } | |
| nnpfc_complexity_info_present_flag | ue(v) |
| if( nnpfc_complexity_info_present_flag ) { | |
| nnpfc_parameter_type_idc | u(2) |
| if( nnpfc_parameter_type_idc != 2 ) | |
| nnpfc_log2_parameter_bit_length_minus3 | u(2) |
| nnpfc_num_parameters_idc | u(6) |
| nnpfc_num_kmac_operations_idc | ue(v) |
| nnpfc_total_kilobyte_size | ue(v) |
| } | |
| } | |
| /* ISO/IEC 15938-17 bitstream */ | |
| if( nnpfc_mode_idc = = 0 ) { | |
| while( !byte_aligned( ) ) | |
| nnpfc_reserved_zero_bit_b | u(1) |
| for( i = 0; more_data_in_payload( ); i++ ) | |
| nnpfc_payload_byte[ i ] | b(8) |
| } | |
| } | |

The NNPFC syntax structures of Table 1 and Table 2 may be signaled in the form of a supplemental enhancement information (SEI) message. An SEI message signaling the NNPFC syntax structures of Table 1 and Table 2 may be referred to as an NNPFC SEI message.

The neural-network post-filter characteristics (NNPFC) SEI message may specify a neural network that may be used as a post-processing filter. The use of specified neural-network post-processing filters (NNPFs) for specific pictures may be indicated using neural-network post-filter activation (NNPFA) SEI messages. Here, "post-processing filter" and "post filter" may have the same meaning.

Use of this SEI message requires the definition of the following variables:

The width and height of the decoded output picture may be cropped in luma sample units, which may be represented as CroppedWidth and CroppedHeight, respectively.

CroppedYPic[idx], a luma sample array of cropped decoded output pictures, and CroppedCbPic[idx] and CroppedCrPic[idx], which are chroma sample arrays, may be used as inputs to the post-processing filter when present, and idx may have a range of 0 to numInputPics−1, inclusive.

BitDepth$_Y$ may represent a bit depth for the luma sample array of the cropped decoded output pictures.

BitDepth$_C$ may represent a bit depth of the chroma sample arrays of the cropped decoded output pictures (if any).

ChromaFormatIdc may represent a chroma format identifier.

When the value of nnpfc_auxiliary_inp_idc is equal to 1, a filtering strength control value StrengthControlVal shall be a real number in the range of 0 to 1, inclusive.

Variables Sub WidthC and SubHeightC may be derived from ChromaFormatIdc. Two or more NNPFC SEI messages may be present for the same picture. If two or more NNPFC SEI messages with different nnpfc_id values are present or are enabled for the same picture, the two or more NNPFC SEI message may have the same or different nnpfc_purpose and nnpfc_mode_idx values.

nnpfc_id may contain an identification number that may be used to identify a post-processing filter. The nnpfc_id value shall be in the range of 0 to $2^{32}−2$, inclusive. The nnpfc_id values in the range of 256 to 511 and in the range of $2^{31}$ to $2^{32}-2$, inclusive, may be reserved for future use. Decoders shall ignore NNPFC SEI messages with nnpfc_id in the range of 256 to 511 or in the range of $2^{31}$ to $2^{32}-2$, inclusive.

If an NNPFC SEI message is the first NNPFC SEI message in decoding order with a particular nnpfc_id value within the current coded layer video sequence (CLVS), the following may apply:

The SEI message may specify a base post-processing filter.

The SEI message may be associated with the current decoded picture and all subsequent decoded pictures of the current layer until the current CLVS ends, in output order.

The NNPFC SEI message may be a repetition of a previous NNPFC SEI message within the current CLVS in decoding order, and subsequent semantics may apply as if this SEI message were the only NNPFC SEI message with identical content within the current CLVS.

If the NNPFC SEI message is not the first NNPFC SEI message in decoding order with a particular nnpfc_id value within the current CLVS, the following may apply:

The SEI message may pertain to the current CLVS or all subsequent decoded pictures of the current layer, in output order, until the current CLVS or until the end of the current CLVS, or may pertain to the next NNPFC SEI message, in output order, having a particular nnpfc_id value within the current CLVS.

When the NNPFC SEI message is the first NNPFC SEI message in decoding order with a particular nnpfc_id value within the current CLVS, the value of nnpfc_mode_idc equal to 1 may specify that the base post-processing filter associated with the nnpfc_id value is a neural network, wherein the neural network may be a neural network identified by a URI denoted by nnpfc_uri using a format identified by a tag URI nnpfc_tag_uri.

When the NNPFC SEI message is not the first NNPFC SEI message in decoding order with a particular nnpfc_id value within the current CLVS, the value of nnpfc_mode_idc equal to 1 may specify that updates to the base post-processing filter with the same nnpfc_id value are defined by a URI denoted by nnpfc_uri using the format identified by a tag URI nnpfc_tag_uri.

The value of nnpfc_mode_idc may be restricted to be in the range of 0 to 1 in the bitstream. Values for nnpfc_mode_idc in the range of 2 to 255, inclusive, may be reserved for future use and may not be present in the bitstream. Decoders shall ignore NNPFC SEI messages with nnpfc_mode_idc in the range of 2 to 255, inclusive. Values of nnpfc_mode_idc greater than 255 are not present in the bitstream and may not be reserved for future use.

When the SEI message is the first NNPFC SEI message in decoding order with a particular nnpfc_id value within the current CLVS, a post-processing filter PostProcessingFilter( ) may be assigned identically to the base post-processing filter.

When the SEI message is not the first NNPFC SEI message in decoding order with a particular nnpfc_id value within the current CLVS, the post-processing filter PostProcessingFilter( ) may be obtained by applying the update defined by the SEI message to the base post-processing filter.

Updates are not cumulative; rather, each update may be applied to the base post-processing filter, which is the post-processing filter specified by the first NNPFC SEI message in decoding order with a particular nnpfc_id value within the current CLVS.

nnpfc_reserved_zero_bit_a may be restricted to have a value equal to 0 due to bitstream constraints. Decoders shall ignore NNPFC SEI messages with a non-zero value of nnpfc_reserved_zero_bit_a.

The nnpfc_tag_uri may contain a tag URI with syntax and semantics specified in IETF RFC 4151 that identifies a neural network used as a base post-processing filter, or an update relative to a base post-processing filter using the nnpfc_id value specified by nnpfc_uri. Use of nnpfc_tag_uri allows for uniquely identifying the format of the neural network data specified by nnrpf_uri without the need for a central registry. nnpfc_tag_uri equal to "tag: iso.org, 2023: 15938-17" may specify that the neural network data identified by nnpfc_uri conforms to ISO/IEC 15938-17.

nnpfc_uri may contain a URI with syntax and semantics specified in IETF Internet Standard 66 that identifies the neural network used as a base postprocessing filter, or an update relative to the base post-processing filter using the same nnpfc_id value.

The value of nnpfc_formatting_and_purpose_flag equal to 1 may specify the presence of syntax elements related to filter purpose, input formatting, output formatting, and complexity. The value of nnpfc_formatting_and_purpose_flag equal to 0 may specify the absence of syntax elements related to filter purpose, input formatting, output formatting, and complexity.

When the SEI message is the first NNPFC SEI message with the particular nnpfc_id value within the current CLVS in decoding order, the value of nnpfc_formatting_and_purpose_flag may be equal to 1. When the SEI message is not the first NNPFC SEI message with the particular nnpfc_id value within the current CLVS in decoding order, the value of nnpfc_formatting_and_purpose_flag may be equal to 0.

nnpfc_purpose may specify the purpose of the post-processing filter as specified in Table 3.

The value of nnpfc_purpose shall be in the range of 0 to 5, inclusive, due to bitstream constraints. The values of nnpfc_purpose in the range of 6 to 1023, inclusive, are not present in the bitstream and may be reserved for future use. Decoders shall ignore NNPFC SEI messages with nnpfc_purpose in the range of 6 to 1203, inclusive. The values of nnpfc_purpose greater than 1023 are not present in the bitstream and are not reserved for future use.

TABLE 3

| Value | Interpretation |
|---|---|
| 0 | May be used as determined by the application |
| 1 | Visual quality enhancement |
| 2 | Chroma upsampling from 4:2:0 chroma format to 4:2:2 or 4:4:4 chroma format, or from 4:2:2 chroma format to 4:4:4 chroma format |
| 3 | Increasing the width and height of the cropped decoded output picture without changing the chroma format |
| 4 | Increasing the width and height of the cropped decoded output picture and upsampling the chroma format |
| 5 | Picture rate upsampling |

When the reserved value of nnpfc_purpose is used in the future, the syntax of this SEI message may be extended to syntax elements that are present only if nnpfc_purpose is equal to the corresponding value. When the value of SubWidthC is 1 and the value of SubHeightC is 1, nnpfc_purpose shall not have a value of 2 or 4.

The value of nnpfc_out_sub_c_flag equal to 1 may specify that the value of outSubWidthC is 1 and the value of outSubHeightC is 1. The value of nnpfc_out_sub_c_flag equal to 0 may specify that the value of outSubWidthC is 2 and the value of outSubHeightC is 1. If nnpfc_out_sub_ c_flag is not present, outSubWidthC may be inferred to be equal to SubWidthC, and outSubHeightC may be inferred to be equal to SubHeightC. When the value of ChromaFormatIdc is 2 and nnpfc_out_sub_c_flag is present, the value of nnpfc_out_sub_c_flag shall be equal to 1.

nnpfc_pic_width_in_luma_samples and nnpfc_pic_height_in_luma_samples may represent the width and height, respectively, of the luma sample array of the picture resulting from applying the post-processing filter identified by nnpfc_id to the cropped decoded output picture. When nnpfc_pic_width_in_luma_samples and nnpfc_pic_height_in_luma_samples are not present, they may be inferred to be equal to CroppedWidth and CroppedHeight, respectively. The value of nnpfc_pic_width_in_luma_samples shall be in the range of CroppedWidth through CroppedWidth*16−1. The value of nnpfc_pic_height_in_luma_samples shall be in the range of CroppedHeight to CroppedHeight*16−1.

nnpfc_num_input_pics_minus2+2 may represent the number of decoded output pictures used as inputs to the post-processing filter.

nnpfc_interpolated pics[i] may represent the number of interpolated pictures generated by the post-processing filter For example, when the value of nnpfc_inp_order_idc is equal to 3 and the value of nnpfc_auxiliary_inp_idc is equal to 1, the input tensor may have 7 channels, including 4 luma matrices, 2 chroma matrices, and 1 auxiliary input matrix. In this case, the DeriveInputTensors( ) process may derive each of the 7 channels of the input tensor one by one, and when a particular channel among these channels is processed, the channel may be referred to as the current channel during the process.

nnpfc_inp_format_idc may specify the method of converting the sample value of the cropped decoded output picture into the input value of the post-processing filter. If nnpfc_inp_format_idc is 0, the input values to the post-processing filter are real numbers, and the InpY( ) and InpC( ) functions may be specified as in Equation 1.

$$\mathrm{Inp}Y(x) = x \div ((1 << \mathrm{BitDepth}Y) - 1)$$

$$\mathrm{Inp}C(x) = x \div ((1 << \mathrm{BitDepth}C) - 1) \qquad \text{[Equation 1]}$$

When the value of nnpfc_inp_format_idc is 1, the input values of the post-processing filter are unsigned integer numbers, and the InpY( ) and InpC( ) functions may be derived as shown in Table 5.

TABLE 5

```
shiftY = BitDepth_Y − inpTensorBitDepth
if( inpTensorBitDepth >= BitDepth_Y)
    InpY( x ) = x << ( inpTensorBitDepth − BitDepth_Y )
else
    InpY( x ) = Clip3(0, ( 1 << inpTensorBitDepth ) − 1, ( x + ( 1 < ( shiftY − 1 ) ) ) ) >> shiftY )
shiftC = BitDepth_C − inpTensorBitDepth
if( inpTensorBitDepth >= BitDepth_C )
    InpC( x ) = x << ( impTensorBitDepth − BitDepth_C )
else
    InpC( x ) = Clip3(0, ( 1 << inpTensorBitDepth ) − 1, ( x + ( 1 < ( shiftC − 1 ) ) ) ) >> shiftC )
``` between the i-th picture used as inputs to the post-processing filter and the (i+1)-th picture.

A variable numInputPics, which represents the number of pictures used as input to the post-processing filter, and a variable numOutputPics, which represents the total number of pictures generated as a result of the post-processing filter, may be derived as shown in Table 4.

TABLE 4

```
if( nnpfc_purpose = = 5 ) {
    numInputPics = nnpfc_num_input_pics_minus2 + 2
    for( i = 0, numOutputPics = 0; i <= numInputPics − 2; i++ )
        numOutputPics += nnpfc interpolated pics[ i ]
} else
    numInputPics = 1
```

The value of nnpfc_component_last_flag equal to 1 may specify that the last dimension of the input tensor inputTensor for the post-processing filter and the output tensor outputTensor, which is the result of the post-processing filter, are used for the current channel. The value of nnpfc_component_last_flag equal to 0 may specify that the third dimension of the input tensor inputTensor for the post-processing filter and the output tensor outputTensor, which is the result of the post-processing filter, are used for the current channel. The first dimension of the input and output tensors may be used in batch indices used in some neural network frameworks. The formula in the semantics of this SEI message use the batch size corresponding to the batch index equal to 0, but the batch size used as input to neural network inference may be determined by the implementation of post-processing.

A variable inpTensorBitDepth_Y may be derived from the syntax element nnpfc_inp_tensor_bitdepth_minus8 as described below. Values of nnpfc_inp_format_idc greater than 1 may be reserved for future use and may not be present in the bitstream. Decoders shall ignore NNPFC SEI messages containing reserved values of nnpfc_inp_format_idc.

nnpfc_inp_tensor_luma_bitdepth_minus8+8 may specify the bit depth of luma sample values in the input integer tensor. The value of inpTensorBitDepth_Y may be derived as shown in Equation 2.

$$\mathrm{inpTensorBitDepth} = \mathrm{nnpfc\_inp\_tensor\_bitdepth\_minus8} + 8 \qquad \text{[Equation 2]}$$

The value of nnpfc_inp_tensor_bitlength_minus8 may be restricted to be in the range of 0 to 24.

nnpfc_inp_order_idc may specify a method of ordering the sample array of the cropped decoded output picture to one of the input pictures for the post-processing filter.

The value of nnpfc_inp_order_idc shall be in the range of 0 to 3, inclusive, in the bitstream. Values of 4 to 255, inclusive, for nnpfc_inp_order_idc shall not be present in the bitstream. Decoders shall ignore NNPFC SEI messages with nnpfc_inp_order_idc in the range of 4 to 255, inclusive. Values of nnpfc_inp_order_idc greater than 255 shall not be present in the bitstream and are not reserved for future use.

When ChromaFormatIdc is not equal to 1, the value of nnpfc_inp_order_idc shall not be 3.

Table 6 shows an informative description of nnpfc_inp_order_idc values.

TABLE 6

Figure 4:
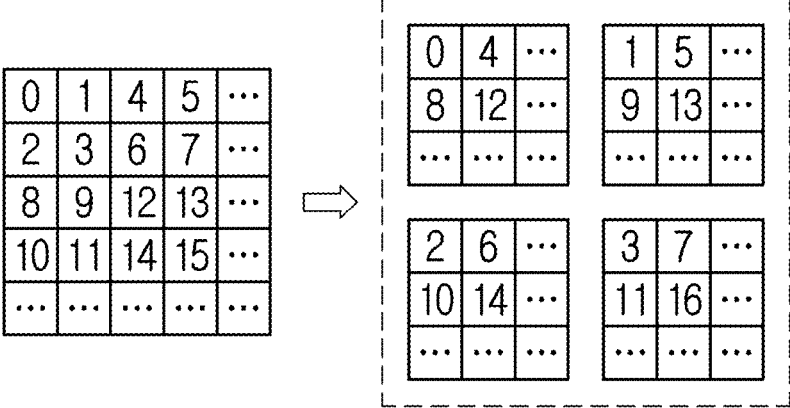
FIG. 4 is a view showing an interleaved method for derivation of a luma channel.

| nnpfc_inp_order_idc | Description |
|---|---|
| 0 | When nnpfc_auxiliary_inp_idc is equal to 0, one luma matrix may be present in the input tensor to each input picture and the number of channels may be 1. When nnpfc_auxiliary_inp_idc is equal to 1, one luma matrix and one auxiliary input matrix may be present and the number of channels may be 2. |
| 1 | When nnpfc_auxiliary_inp_idc is equal to 0, two chroma matrices may be present in the input tensor and the number of channels may be 2. When nnpfc_auxiliary_inp_idc is equal to 1, two chroma matrices and one auxiliary input matrix may be present and the number of channels may be 3. |
| 2 | When nnpfc_auxiliary_inp_idc is equal to 0, one luma matrix and two chroma matrices may be present in the input tensor and the number of channels may be 3. When nnpfc_auxiliary_inp_idc is equal to 1, one luma matrix, two chroma matrices and one auxiliary input matrix may be present and the number of channels may be 4. |
| 3 | When nnpfc_auxiliary_inp_idc is equal to 0, four luma matrices and two chroma matrices may be present in the input tensor and the number of channels may be 6. When nnpfc_auxiliary_inp_idc is equal to 1, four luma matrices, two chroma matrices and one auxiliary input matrix may be present and the number of channels may be 7. The luma channel may be derived using an interleaved method as shown in FIG. 4. nnpfc_inp_order_idc may be used only when an input chroma format is 4:2:0. |
| 4 . . . 255 | reserved |

A patch is a rectangular array of samples from a component (e.g., a luma or chroma component) of a picture.

nnpfc_auxiliary_inp_idc greater than 0 may specify that auxiliary input data is present in the input tensor of the neural-network post-filter. nnpfc_auxiliary_inp_idc equal to 0 may specify that auxiliary input data is not present in the input tensor. nnpfc_auxiliary_inp_idc equal to 1 may specify that auxiliary input data is derived through the method shown in Table 7 to Table 9.

The value of nnpfc_auxiliary_inp_idc shall be in the range of 0 to 1, inclusive, in bitstreams. Values of 2 to 255, inclusive, for nnpfc_inp_order_idc shall not be present in bitstreams. Decoders shall ignore NNPFC SEI messages with nnpfc_inp_order_idc in the range of 2 to 255, inclusive. Values of nnpfc_inp_order_idc greater than 255 shall not be present in the bitstream and are not reserved for future use.

The process DeriveInputTensors( ) to derive an input tensor inputTensor for given vertical sample coordinates cTop and horizontal sample coordinates cLeft specifying the top-left sample position of the sample patch contained in the input tensor may be represented as a combination of Tables 7 to 9.

TABLE 7

```
for( i = 0; i < numInputPics; i++ ) {
    if( nnpfc_inp_order_idc = = 0 )
        for( yP = −overlapSize; yP < inpPatchHeight + overlapSize; yP++)
            for( xP = −overlapSize; xP < inpPatch Width + overlapSize; xP++ ) {
                inp Val = InpY( InpSample Val( cTop + yP, cLeft + xP, CroppedHeight,
                    CroppedWidth, CroppedYPic[ i ] ) )
                if( !nnpfc_component_last flag )
                    inputTensor[ 0 ][ i ][ 0 ][ yP + overlapSize ][ xP + overlapSize ] = inpVal
                else
                    input Tensor[ 0 ][ i ][ yP + overlapSize ][ xP + overlapSize ][ 0 ] = inpVal
                if( nnpfc_auxiliary_inp_idc == 1)
                    if( !nnpfc component last flag )
                        inputTensor[ 0 ][ i ][ 1 ][ yP + overlapSize ][ xP + overlapSize ] = StrengthControlV
                    else
                        inputTensor[ 0 ][ i ][ yP + overlapSize ][ xP + overlapSize ][ 1 ] = StrengthControlV
            }
    else if( nnpfc_inp_order_idc = = 1 )
        for( yP = −overlapSize; yP < inpPatchHeight + overlapSize; yP++)
            for( xP = −overlapSize: xP < inpPatchWidth + overlapSize; xP++ ) {
                inpCbVal = InpC( InpSampleVal( cTop + yP, cLeft + xP, CroppedHeight / SubHeightC,
                    CroppedWidth / SubWidthC, CroppedCbPic[ i ] ) )
                inpCrVal = InpC( InpSampleVal( cTop + yP, cLeft + xP, CroppedHeight / SubHeightC,
                    CroppedWidth / SubWidthC, CroppedCrPic[ i ] ) )
                if( !nnpfc_component_last_flag ) {
                    inputTensor[ 0 ][ i ][ 0 ][ yP + overlapSize ][ xP + overlapSize ] = inpCbVal
                    inputTensor[ 0 ][ i ][ 1 ][ yP + overlapSize ][ xP + overlapSize ] = inpCrVal
                } else {
                    input Tensor[ 0 ][ i ][ yP + overlapSize ][ xP + overlapSize ][ 0 ] = inpCbVal
                    input Tensor[ 0 ][ i ][ yP + overlapSize ][ xP + overlapSize ][ 1 ] = inpCrVal
                }
                if( nnpfc_auxiliary_inp_idc = = 1 )
                    if( !nnpfc_component_last_flag )
```

TABLE 7-continued

```
            inputTensor[ 0 ][ i ][ 2 ][ yP + overlapSize ][ xP + overlapSize ] = StrengthControlV
        else
            inputTensor[ 0 ][ i ][ yP + overlapSize ][ xP + overlapSize ][ 2 ] = StrengthControlV
    }
```

TABLE 8

```
else if( nnpfc_inp_order_idc = = 2 )
    for( yP = −overlapSize; yP < inpPatchHeight + overlapSize; yP++)
        for( xP = −overlapSize; xP < inpPatchWidth + overlapSize; xP++ ) {
            yY = cTop + yP
            xY = cLeft + xP
            yC = yY / SubHeightC
            xC = xY / SubWidthC
            inp YVal = InpY( InpSample Val( yY, xY, CroppedHeight,
                CroppedWidth, CroppedYPic[ i ] ) )
            inpCbVal = InpC( InpSampleVal( yC, xC, CroppedHeight / SubHeightC,
                CroppedWidth / SubWidthC, CroppedCbPic[ i ] ) )
            inpCrVal = InpC( InpSampleVal( yC, xC, CroppedHeight / SubHeightC,
                CroppedWidth / SubWidthC, CroppedCrPic[ i ] ) )
            if( !nnpfc_component_last_flag ) {
                inputTensor[ 0 ][ i ][ 0 ][ yP + overlapSize ][ xP + overlapSize ] = inpYVal
                inputTensor[ 0 ][ i ][ 1 ][ yP + overlapSize ][ xP + overlapSize ] = inpCbVal
                inputTensor[ 0 ][ i ][ 2 ][ yP + overlapSize ][ xP + overlapSize ] = inpCrVal
            } else {
                inputTensor[ 0 ][ i ][ yP + overlapSize ][ xP + overlapSize ][ 0 ] = inpYVal
                inputTensor[ 0 ][ i ][ yP + overlapSize ][ xP + overlapSize ][ 1 ] = inpCbVal
                inputTensor[ 0 ][ i ][ yP + overlapSize ][ xP + overlapSize ][ 2 ] = inpCrVal
            }
            if( nnpfc_auxiliary_inp_idc = = 1 )
                if( !nnpfc_component_last_flag )
                    inputTensor[ 0 ][ 1 ][ 3 ][ yP + overlapSize ][ xP + overlapSize ] = StrengthControlVa
                else
                    inputTensor[ 0 ][ i ][ yP + overlapSize ][ xP + overlapSize ][ 3 ] = StrengthControlVa
        }
```

35

TABLE 9

```
else if( nnpfc_inp_order_idc == 3 )
    for( yP = −overlapSize; yP < inpPatchHeight + overlapSize; yP++)
        for( xP = −overlapSize; xP < inpPatchWidth + overlapSize; xP++ ) {
            yTL = cTop + yP * 2
            xTL = cLeft + xP * 2
            yBR = yTL + 1
            xBR = xTL + 1
            yC = cTop / 2 + yP
            xC = cLeft / 2 + xP
            inpTLVal = InpY( InpSampleVal( yTL, xTL, CroppedHeight,
                CroppedWidth, CroppedYPic[ i ] ) )
            inpTRVal = InpY( InpSampleVal( yTL, xBR, CroppedHeight,
                CroppedWidth, CroppedYPic[ i ] ) )
            inpBLVal = InpY( InpSampleVal( yBR, xTL, CroppedHeight,
                CroppedWidth, CroppedYPic[ i ] ) )
            inpBRVal = InpY( InpSampleVal( yBR, xBR, CroppedHeight,
                CroppedWidth, CroppedYPic[ i ] ) )
            inpCbVal = InpC( InpSampleVal( yC, xC, CroppedHeight / 2,
                CroppedWidth / 2, CroppedCbPic[ i ] ) )
            inpCrVal = InpC( InpSampleVal( yC, xC, CroppedHeight / 2,
                CroppedWidth / 2, CroppedCrPic[ i ] ) )
            if( !nnpfc_component_last_flag ) {
                inputTensor[ 0 ][ i ][ 0 ][ yP + overlapSize ][ xP + overlapSize ] = inpTLVal
                inputTensor[ 0 ][ i ][ 1 ][ yP + overlapSize ][ xP + overlapSize ] = inpTRVal
                inputTensor[ 0 ][ i ][ 2 ][ yP + overlapSize ][ xP + overlapSize ] = inpBLVal
                inputTensor[ 0 ][ i ][ 3 ][ yP + overlapSize ][ xP + overlapSize ] = inpBRVal
                inputTensor[ 0 ][ i ][ 4 ][ yP + overlapSize ][ xP + overlapSize ] = inpCbVal
                inputTensor[ 0 ][ i ][ 5 ][ yP + overlapSize ][ xP + overlapSize ] = inpCrVal
            } else {
                inputTensor[ 0 ][ i ][ yP + overlapSize ][ xP + overlapSize ][ 0 ] = inpTLVal
                inputTensor[ 0 ][ i ][ yP + overlapSize ][ xP + overlapSize ][ 1 ] = inpTRVal
                inputTensor[ 0 ][ i ][ yP + overlapSize ][ xP + overlapSize ][ 2 ] = inpBLVal
                inputTensor[ 0 ][ i ][ yP + overlapSize ][ xP + overlapSize ][ 3 ] = inpBRVal
```

TABLE 9-continued

```
            inputTensor[ 0 ][ i ][ yP + overlapSize ][ xP + overlapSize ][ 4 ] = inpCbVal
            inputTensor[ 0 ][ i ][ yP + overlapSize ][ xP + overlapSize ][ 5 ] = inpCrVal
        }
        if( nnpfc_auxiliary_inp_idc = = 1 )
        if( !nnpfc_component_last_flag )
            inputTensor[ 0 ][ i ][ 6 ][ yP + overlapSize ][ xP + overlapSize ] = StrengthCon-
trolV;
        else
            inputTensor[ 0 ][ i ][ yP + overlapSize ][ xP + overlapSize ][ 6 ] = StrengthCon-
trolV;
        }
    }
}
``` nnpfc_separate_colour_description_present_flag equal to 1 may specify that a unique combination of colour primaries, transform characteristics and matrix coefficients for a picture due to the post-processing filter is specified in the SEI message syntax structure. nnfpc_separate_colour_description_present_flag equal to 0 may specify that the combination of colour primaries, transform characteristics and matrix coefficients for a picture due to the post-processing filter is the same as indicated in the VUI parameters of CLVS.

nnpfc_colour_primaries may have the same semantics as those defined for the vui_colour_primaries syntax element, except that:

nnpfc_colour_primaries may specify the primary colors of a picture that result from applying the neural-network post-filter specified in the SEI message, rather than the primary colors used in CLVS.

If nnpfc_colour_primaries is not present in the NNPFC SEI message, the value of nnpfc_colour_primaries may be inferred to be the same as the value of vui_colour_primaries.

nnpfc_transfer_characteristics may have the same semantics as those defined for the vui_transfer_characteristics syntax element, except that:

nnpfc_transfer_characteristics may specify the transform characteristics of a picture that results from applying the neural-network post-filter specified in the SEI message, rather than the transform characteristics used in the CLVS.

If nnpfc_transfer_characteristics is not present in the NNPFC SEI message, the value of nnpfc_transfer_characteristics may be inferred to be the same as the value of vui_transfer_characteristics.

nnpfc_matrix_coeffs may have the same semantics as specified for the vui_matrix_coeffs syntax element, except that:

nnpfc_matrix_coeffs may specify the matrix coefficients of the picture resulting from applying the neural-network post-filter specified in the SEI message, rather than the matrix coefficients used for CLVS.

If nnpfc_matrix_coeffs is not present in the NNPFC SEI message, the value of nnpfc_matrix_coeffs may be inferred to be the same as the value of vui_matrix_coeffs.

The allowed values for nnpfc_matrix_coeffs may not be restricted by the chroma format of the decoded video pictures, as indicated by the ChromaFormatIdc value for the semantics of the VUI parameters.

If the value of nnpfc_matrix_coeffs is equal to 0, the value of nnpfc_out_order_idc cannot be equal to 1 or 3.

nnpfc_out_format_id equal to 0 may specify that the sample values output by the post-processing filter are real numbers whose value range from 0 to 1 is linearly mapped to an unsigned integer value range of 0 to (1<<bitDepth)−1, for the bit depth bitDepth required for subsequent post-processing or display. nnpfc_out_format_flag equal to 1 may specify that the sample values output by the post-processing filter are unsigned integers in the range of 0 to (1<< (nnpfc_out_tensor_bitlength_minus8+8))−1. Values of nnpfc_out_format_idc greater than 1 are not present in the bitstream. Decoders shall ignore NNPFC SEI messages containing reserved values for nnpfc_out_format_idc. '+8' may specify the bit depth of the sample values in the output integer tensor. The value of nnpfc_out_tensor_bitlength_minus8 shall be in the range of 0 to 24.

nnpfc_out_order_idc may specify the output order of samples output from the post-processing filter. The value of nnpfc_out_order_idc shall be in the range of 0 to 3 in the bitstream. Values of 4 to 255 for nnpfc_out_order_idc shall not be present in the bitstream. Decoders shall ignore NNPFC SEI messages with nnpfc_out_order_idc in the range of 4 to 255. Values of nnpfc_out_order_idc greater than 255 are not present in the bitstream and are not reserved for future use. The value of nnpfc_out_order_idc cannot be equal to 3 when the value of nnpfc_purpose is 2 or 4.

Table 10 describes the values of nnpfc_out_order_idc.

TABLE 10

| nnpfc_out_order_idc | Description |
| --- | --- |
| 0 | Since only a luma matrix is present in the output tensor, the number of channels may be equal to 1. |
| 1 | Since only chroma matrices are present in the output tensor, the number of channels may be equal to 2. |
| 2 | Since luma and chroma matrices are present in the output tensor, the number of channels may be equal to 3. |
| 3 | Since four luma matrices and two chroma matrices are present in the output tensor, the number of channels may be equal to 6. It may be used only when nnpfc_out_order_idc output chroma format is 4:2:0. |
| 4 . . . 255 | reserved |

The process StoreOutputTensors( ) to derive sample values in the filtered output sample arrays FilteredYPic, FilteredCbPic and FilteredCrPic from the output tensor outputTensor for the given vertical sample coordinates cTop and horizontal sample coordinates cLeft indicating the top-left sample position for the patch of samples contained in the input tensor may be expressed as a combination of Tables 11 and 12.

TABLE 11

```
for( i = 0; i < numInputPics; i++ ) {
  if( nnpfc_out_order_idc = = 0 )
    for( yP = 0; yP < outPatchHeight; yP++)
      for( xP = 0; xP < outPatchWidth; xP++ ) {
        yY = cTop * outPatchHeight / inpPatchHeight + yP
        xY = cLeft * outPatchWidth / inpPatchWidth + xP
        if ( yY < nnpfc_pic_height_in_luma_samples && xY < nnpfc_pic_width_in_luma_sampl
          if( !nnpfc_component_last_flag )
            FilteredYPic[ i ][ xY ][ yY ] = outputTensor[ 0 ][ i ][ 0 ][ yP ][ xP ]
          else
            FilteredYPic[ i ][ xY ][ yY ] = outputTensor[ 0 ][ i ][ yP ][ xP ][ 0 ]
      }
  else if( nnpfc_out_order_idc = = 1 )
    for( yP = 0; yP < outPatchCHeight; yP++)
      for( xP = 0; xP < outPatchCWidth; xP++ ) {
        xSrc = cLeft * horCScaling + xP
        ySrc = cTop * verCScaling + yP
        if ( ySrc < nnpfc_pic_height_in_luma_samples / outSubHeightC &&
             xSrc < nnpfc_pic_width_in_luma_samples / outSubWidthC )
          if( !nnpfc_component_last_flag ) {
            FilteredCbPic[ i ][ xSrc ][ ySrc ] = outputTensor[ 0 ][ i ][ 0 ][ yP ][ xP ]
            FilteredCrPic[ i ][ xSrc ][ ySrc ] = outputTensor[ 0 ][ i ][ 1 ][ yP ][ xP ]
          } else {
            FilteredCbPic[ i ][ xSrc ][ ySrc ] = outputTensor[ 0 ][ i ][ yP ][ xP ][ 0 ]
            FilteredCrPic[ i ][ xSrc ][ ySrc ] = outputTensor[ 0 ][ i ][ yP ][ xP ][ 1 ]
          }
      }
  else if( nnpfc_out_order_idc = = 2 )
    for( yP = 0; yP < outPatchHeight; yP++)
      for( xP = 0; xP < outPatchWidth; xP++ ) {
        yY = cTop * outPatchHeight / inpPatchHeight + yP
        xY = cLeft * outPatchWidth / inpPatchWidth + xP
        yC = yY / outSubHeightC
        xC = xY / outSubWidthC
        yPc = ( yP / outSubHeightC ) * outSubHeightC
        xPc = ( xP / outSubWidthC ) * outSubWidthC
        if ( yY < nnpfc_pic_height_in_luma_samples && xY < nnpfc_pic_width_in_luma_sample
          if( !nnpfc_component_last_flag ) {
            FilteredYPic[ i ][ xY ][ yY ] = outputTensor[ 0 ][ i ][ 0 ][ yP ][ xP ]
            FilteredCbPic[ i ][ xC ][ yC ] = outputTensor[ 0 ][ i ][ 1 ][ yPc ][ xPc ]
            FilteredCrPic[ i ][ xC ][ yC ] = outputTensor[ 0 ][ i ][ 2 ][ yPc ][ xPc ]
          } else {
```

TABLE 12

```
            FilteredYPic[ i ][ xY ][ yY ] = outputTensor[ 0 ][ i ][ yP ][ xP ][ 0 ]
            FilteredCbPic[ i ][ xC ][ yC ] = outputTensor[ 0 ][ i ][ yPc ][ xPc ][ 1 ]
            FilteredCrPic[ i ][ xC ][ yC ] = outputTensor[ 0 ][ i ][ yPc ][ xPc ][ 2 ]
          }
      }
  else if( nnpfc_out_order_idc = = 3 )
    for( yP = 0; yP < outPatchHeight; yP++ )
      for( xP = 0; xP < outPatchWidth; xP++ ) {
        ySrc = cTop / 2 * outPatchHeight / inpPatchHeight + yP
        xSrc = cLeft / 2 * outPatchWidth / inpPatchWidth + xP
        if ( ySrc < nnpfc_pic_height_in_luma_samples / 2 &&
             xSrc < nnpfc_pic_width_in_luma_samples / 2 )
          if( !nnpfc_component_last_flag ) {
            FilteredYPic[ i ][ xSrc * 2 ][ ySre * 2 ] = outputTensor[ 0 ][ i ][ 0 ][ yP ][ xP ]
            FilteredYPic[ i ][ xSrc * 2 + 1 ][ ySrc * 2 ] = outputTensor[ 0 ][ i ][ 1 ][ yP ][ xP ]
            FilteredYPic[ i ][ xSrc * 2 ][ ySrc * 2 + 1 ] = outputTensor[ 0 ][ i ][ 2 ][ yP ][ xP ]
            FilteredYPic[ i ][ xSrc * 2 + 1 ][ ySrc * 2 + 1 ] = outputTensor[ 0 ][ i ][ 3 ][ yP ][ xP ]
            FilteredCbPic[ i ][ xSrc ][ ySrc ] = outputTensor[ 0 ][ i ][ 4 ][ yP ][ xP ]
            FilteredCrPic[ i ][ xSrc ][ ySrc ] = outputTensor[ 0 ][ i ][ 5 ][ yP ][ xP ]
          } else {
            FilteredYPic[ i ][ xSrc * 2 ][ ySrc * 2 ] = outputTensor[ 0 ][ i ][ yP ][ xP ][ 0 ]
            FilteredYPic[ i ][ xSrc * 2 + 1 ][ ySrc * 2 ] = outputTensor[ 0 ][ i ][ yP ][ xP ][ 1 ]
```

TABLE 12-continued

```
        FilteredYPic[ i ][ xSrc * 2 ][ ySrc * 2 + 1 ] = outputTensor[ 0 ][ i ][ yP ][ xP ][ 2 ]
        FilteredYPic[ i ][ xSrc * 2 + 1 ][ ySrc * 2 + 1 ] = outputTensor[ 0 ][ i ][ yP ][ xP ][ 3 ]
        FilteredCbPic[ i ][ xSrc ][ ySrc ] = outputTensor[ 0 ][ i ][ yP ][ xP ][ 4 ]
        FilteredCrPic[ i ][ xSrc ][ ySrc ] = outputTensor[ 0 ][ i ][ yP ][ xP ][ 5 ]
        }
    }
}
``` nnpfc_constant_patch_size_flag equal to 1 may specify that the post-processing filter receives as input exactly the patch sizes indicated by nnpfc_patch_width_minus1 and nnpfc_patch_height_minus1. nnpfc_constant_patch_size_flag equal to 0 may specify that the post-processing filter receives as input any patch size that is a positive integer multiple of the patch size indicated by nnpfc_patch_width_minus1 and nnpfc_patch_height_minus1. npfc_patch_width_minus1+1 may specify the number of horizontal samples of the patch size required for the input of the post-processing filter when the value of nnpfc_constant_patch_size_flag is equal to 1. The value of nnpfc_patch_width_minus1 shall be in the range of 0 to Min (32766, CroppedWidth−1).

npfc_patch_height_minus1+1 may specify the number of vertical samples of the patch size required for the input of the post-processing filter when the value of nnpfc_constant_patch_size_flag is equal to 1. The value of nnpfc_patch_height_minus1 shall be in the range of 0 to Min (32766, CroppedHeight−1).

Variables inpPatchWidth and inpPatchHeight may be set to the patch size width and patch size height respectively.

When the value of nnpfc_constant_patch_size_flag is equal to 0, the following may apply:

The values of inpPatchWidth and inpPatchHeight may be provided by external means or set by the postprocessor itself.

The value of inpPatchWidth shall be a positive integer multiple of nnpfc_patch_width_minus1+1 and shall be less than or equal to CroppedWidth. The value of inpPatchHeight shall be a positive integer multiple of nnpfc_patch_height_minus1+1 and shall be less than or equal to CroppedHeight.

Otherwise (if the value of nnpfc_constant_patch_size_flag is equal to 1), the value of inpPatchWidth may be set equal to nnpfc_patch_width_minus1+1, and the value of inpPatchHeight may be set equal to nnpfc_patch_height_minus1+1.

nnpfc_overlap may specify the number of overlapping horizontal and vertical samples of adjacent input tensors of the post-processing filter. The value of nnpfc_overlap shall be in the range of 0 to 16383.

Variables outPatchWidth, outPatchHeight, horCScaling, verCScaling, outPatchCWidth, outPatchCHeight, and overlapSize may be derived as shown in Table 13.

TABLE 13

```
ioutPatchWidth = ( nnpfc_pic_width_in_luma_samples * inpPatchWidth ) / CroppedWidth
outPatchHeight = ( nnpfc_pic_height_in_luma_samples * inpPatchHeight ) / CroppedHeight
horCScaling = SubWidthC / outSubWidthC
verCScaling = SubHeightC / outSubHeightC
outPatchCWidth = outPatchWidth * horCScaling
outPatchCHeight = outPatchHeight * verCScaling
overlapSize = nnpfc_overlap
```

It is a requirement of bitstream conformance that outPatchWidth*CroppedWidth shall be equal to nnpfc_pic_width_in_luma_samples*inpPatchWidth, and outPatchHeight*CroppedHeight shall be equal to nnpfc_pic_height_in_luma_samples*inpPatchHeight.

nnpfc_padding_type may specify the padding process when referencing sample positions outside the boundary of a cropped decoded output picture as described in Table 14. The value of nnpfc_padding_type shall be in the range of 0 to 15.

TABLE 14

| nnpfc_padding_type | Description |
|---|---|
| 0 | zero padding |
| 1 | replication padding |
| 2 | reflection padding |
| 3 | wrap-around padding |
| 4 | fixed padding |
| 5 . . . 15 | reserved | nnpfc_luma_padding_val may specify the luma value to be used for padding when the value of nnpfc_padding_type is 4.

nnpfc_cb_padding_val may specify the Cb value to be used for padding when the value of nnpfc_padding_type is 4.

nnpfc_cr_padding_val may specify the Cr value to be used for padding when the value of nnpfc_padding_type is 4.

InpSampleVal(y, x, picHeight, picWidth, CroppedPic) function, whose inputs are vertical sample positions y, horizontal sample positions x, picture height picHeight, picture width picWidth, and sample array CroppedPic, may return the derived SampleVal values as shown in Table 15.

For the input to the InpSampleVal ( ) function, the vertical positions may be listed before the horizontal positions for compatibility with the input tensor rules of some inference engines.

TABLE 15

```
if( nnpfc_padding_type = = 0 )
    if( y < 0 | | x < 0 | | y >= picHeight | | x >= picWidth )
        sampleVal = 0
    else
        sampleVal = croppedPic[ x ][ y ]
else if( nnpfc_padding_type = = 1 )
    sampleVal = croppedPic[ Clip3( 0, picWidth − 1, x ) ][ Clip3( 0, picHeight − 1, y ) ]
else if( nnpfc_padding_type = = 2 )
    sampleVal = croppedPic[ Reflect( picWidth − 1, x ) ][ Reflect( picHeight − 1, y ) ]
else if( nnpfc_padding_type = = 3 )
    if( y >= 0 && y < picHeight )
        sampleVal = croppedPic[ Wrap( picWidth − 1, x ) ][ y ]
else if( nnpfc_padding_type = = 4 )
    if( y < 0 | | x < 0 | | y >= picHeight | | x >= picWidth )
        sampleVal[ 0 ] = nnpfc_luma_padding_val
        sampleVal[ 1 ] = nnpfc_cb_padding_val
        sampleVal[ 2 ] = nnpfc_cr_padding_val
    else
        sampleVal = croppedPic[ x ][ y ]
```

The process in Table 16 may be used to filter the cropped decoded output picture in a patch-wise manner using a post-processing filter PostProcessingFilter( ) to generate a filtered picture, which may include a Y sample array FilteredYPic, a Cb sample array FilteredCbPic and a Cr sample array FilteredCrPic as indicated by nnpfc_out_order_idc.

TABLE 16

```
if( nnpfc_inp_order_idc = = 0 )
    for( cTop = 0; cTop < CroppedHeight; cTop += inpPatchHeight )
        for( cLeft = 0; cLeft < CroppedWidth; cLeft += inpPatchWidth ) {
            DeriveInputTensors( )
            outputTensor = PostProcessingFilter( inputTensor )
            StoreOutputTensors( )
        }
else if( nnpfc_inp_order_idc = = 1 )
    for( cTop = 0; cTop < CroppedHeight / SubHeightC; cTop += inpPatchHeight )
        for( cLeft = 0; cLeft < CroppedWidth / SubWidthC; cLeft += inpPatchWidth )
            DeriveInputTensors( )
            outputTensor = PostProcessingFilter( inputTensor )
            StoreOutputTensors( )
        }
else if( nnpfc_inp_order_idc = = 2 )
    for( cTop = 0; cTop < CroppedHeight; cTop += inpPatchHeight)
        for( cLeft = 0; cLeft < CroppedWidth; cLeft += inpPatchWidth) {
            DeriveInputTensors( )
            outputTensor = PostProcessingFilter( inputTensor )
            StoreOutputTensors( )
        }
else if( nnpfc_inp_order_idc == 3 )
    for( cTop = 0; cTop < CroppedHeight; cTop += inpPatchHeight * 2 )
        for( cLeft = 0; cLeft < CroppedWidth; cLeft += inpPatchWidth * 2 ) {
            DeriveInputTensors( )
            outputTensor = PostProcessingFilter( inputTensor )
            StoreOutputTensors( )
        }
``` nnpfc_complexity_info_present_flag equal to 1 may specify the presence of one or more syntax elements indicating the complexity of the post-processing filter associated with nnpfc_id. nnpfc_complexity_info_present_flag equal to 0 may specify the absence of syntax elements indicating the complexity of the post-processing filter associated with nnpfc_id.

nnpfc_parameter_type_idc equal to 0 may specify that the neural network uses only integer parameters. nnpfc_parameter_type_flag equal to 1 may specify that the neural network may use either floating-point or integer parameters. nnpfc_parameter_type_idc equal to 2 may specify that the neural network uses only binary parameters. nnpfc_parameter_type_idc equal to 3 may be reserved for future use and is not present in the bitstream. Decoders shall ignore NNPFC SEI messages with nnpfc_parameter_type_idc equal to 3.

nnpfc_log 2_parameter_bit_length_minus3 equal to 0, 1, 2 and 3 may specify that the neural network does not use parameters with bit lengths greater than 8, 16, 32, and 64, respectively. If nnpfc_parameter_type_idc is present and nnpfc_log 2_parameter_bit_length_minus3 is not present, the neural network may not use parameters with bit lengths greater than 1.

nnpfc_num_parameters_idc may specify the maximum number of neural network parameters for the post-processing filter in units of a power of 2048. nnpfc_num_parameters_idc equal to 0 may specify that the maximum number of neural network parameters is unknown. The value of nnpfc_num_parameters_idc shall be in the range of 0 to 52. Values of nnpfc_num_parameters_idc greater than 52 is not present in the bitstream. Decoders shall ignore NNPFC SEI messages with nnpfc_num_parameters_idc greater than 52.

When the value of nnpfc_num_parameters_idc is greater than 0, a variable maxNumParameters may be derived as in Equation 3.

$$\text{maxNumParameters}=(2048<<\text{nnpfc\_num\_parameters\_idc})-1 \qquad \text{[Equation 3]}$$

The number of neural network parameters in the post-processing filter may be limited to be less than or equal to maxNumParameters.

nnpfc_num_kmac_operations_idc greater than 0 may specify that the maximum number of multiply-accumulate operations per sample in the post-processing filter is less than or equal to nnpfc_num_kmac_operations_idc*1000. nnpfc_num_kmac_operations_idc equal to 0 may specify that the maximum number of multiply-accumulate operations in the network is unknown. The value of nnpfc_num_kmac_operations_idc shall be in the range of 0 to $2^{32}-1$, inclusive.

nnpfc_total_kilobyte_size greater than 0 may specify the total size (in kilobytes) required to store the uncompressed parameters of the neural network. The total size in bits may be a number greater than or equal to the sum of the bits used to store each parameter. nnpfc_total_kilobyte_size may be obtained by dividing the total size (in bits) by 8000 and rounding it up. nnpfc_total_kilobyte_size equal to 0 may specify that the total size required to store the parameters for the neural network is unknown. The value of nnpfc_total_kilobyte_size shall be in the range 0 to $2^{32}-1$, inclusive.

nnpfc_reserved_zero_bit_b shall be equal to 0 in the bitstream. Decoders shall ignore NNPFC SEI messages where nnpfc_reserved_zero_bit_b is not 0.

nnpfc_payload_byte[i] may contain the i-th byte of the bitstream. The byte sequence nnpfc_payload_byte[i] for all present values of i shall be a complete bitstream conforming to ISO/IEC 15938-17.

Neural-Network Post-Filter Activation (NNFPA)

The syntax structure for the NNFPA is shown in Table 17.

TABLE 17

| | Descriptor |
|---|---|
| nn_post_filter_activation( payloadSize ) | |
| { | |
|    nnpfa_target_id | ue(v) |
|    nnpfa_cancel_flag | u(1) |
|    if( !nnpfa_cancel_flag ) { | |
|       nnpfa_persistence_flag | u(1) |
| } | |

The NNPFA syntax structure of Table 17 may be signaled in the form of an SEI message. An SEI message signaling the NNPFA syntax structure of Table 17 may be referred to as an NNPFA SEI message.

The NNPFA SEI message enables or disables the possible use of a target neural-network post-processing filter identified by nnpfa_target_id for post-processing filtering of a set of pictures.

Multiple NNPFA SEI messages may be present for the same picture, if the post-processing filter is used for different purposes or filters different color components.

nnpfa_target_id may specify a target neural-network post-processing filter, which is associated with the current picture and is specified by one or more NNPFC SEI messages having an nnpfc_id equal to nnfpa_target_id.

The value of nnpfa_target_id shall be in the range of 0 to $2^{32}-2$, inclusive. nnpfa_target_id values in the range of 256 to 511 and in the range of $2^{31}$ to $2^{32}-2$, inclusive, may be reserved for future use. Decoders shall ignore NNPFA SEI messages with nnpfa_target_id in the range of 256 to 511 or in the range of $2^{31}$ to $2^{32}-2$, inclusive.

An NNPFA SEI message with a specific value of nnpfa_target_id shall not be present in the current picture unit (PU) unless one or both of the following conditions are true. Here, the PU may be a set of NAL units containing VCL NAL units of a coded picture and their associated non-VCL VAL units.

Within the current CLVS, there is an NNPFC SEI message with an nnpfc_id equal to a particular value of nnpfa_target_id that is present in the PU (picture unit) preceding the current PU (picture unit) in the decoding order.

There is an NNPFC SEI message with nnpfc_id equal to a particular value of nnpfa_target_id of the current PU (picture unit).

If a PU (picture unit) contains both an NNPFC SEI message with a particular value of nnpfc_id and an NNPFA SEI message with an nnpfa_target_id equal to a particular value of nnpfc_id, the NNPFC SEI message shall precede the NNPFA SEI message in decoding order.

nnpfa_cancel_flag equal to 1 may specify that the persistence of the target neural-network post-processing filter set by any previous NNPFA SEI message with the same nnpfa_target_id as the current SEI message is cancelled. That is, the target neural-network post-processing filter is no longer used unless it is activated by another NNPFA SEI message with the same nnpfa_target_id as the current SEI message and nnpfa_cancel_flag equal to 0. nnpfa_cancel_flag equal to 0 may specify that nnpfa_persistence_flag follows.

nnpfa_persistence_flag may specify the persistence of the target neural-network post-processing filter for the current layer. nnpfa_persistence_flag equal to 0 may specify that the target neural-network post-processing filter may only be used for post-processing filtering for the current picture. nnpfa_persistence_flag equal to 1 may specify that the target neural-network post-processing filter may be used for post-processing filtering for the current picture and all subsequent pictures in the current layer in output order until one or more of the following conditions are true:

A new CLVS of the current layer begins.

The bitstream ends.

A picture in the current layer associated with an NNPFA SEI message with the same nnpfa_target_id as the current SEI message and nnpfa_cancel_flag equal to 1 is output after the current picture in output order.

The target neural-network post-processing filter is not applied to subsequent pictures within the current layer associated with an NNPFA SEI message with the same nnpfa_target_id as the current SEI message and nnpfa_cancel_flag equal to 1.

Post-Filter Hint

The syntax structure for a post-filter hint is shown in Table 18.

TABLE 18

| | Descriptor |
|---|---|
| post_filter_hint( payloadSize ) { | |
|    filter_hint_cancel_flag | u(1) |
|    if( !filter_hint_cancel_flag ) { | |

TABLE 18-continued

| | Descriptor |
|---|---|
| filter_hint_persistence_flag | u(1) |
| filter_hint_size_y | ue(v) |
| filter_hint_size_x | ue(v) |
| filter_hint_type | u(2) |
| filter_hint_chroma_coeff_present_flag | u(1) |
|   for( cIdx = 0; cIdx < ( filter_hint_chroma_coeff_present_flag ? 3 : 1 ); cIdx++ ) | |
|     for( cy = 0; cy < filter_hint_size_y; cy++ ) | |
|       for( cx = 0; cx < filter_hint_size_x; cx++ ) | |
|         filter_hint_value[ cIdx ][ cy ][ cx ] | se( v ) |
|   } | |
| } | |

The post-filter hint syntax structure of Table 18 may be signaled in the form of an SEI message. An SEI message signaling the post-filter hint syntax structure of Table 18 may be referred to as a post-filter hint SEI message.

The post-filter hint SEI message may provide post-filter coefficients or correlation information for the design of a post-filter to potentially use a set of decoded and output pictures in post-processing in order to obtain improved display quality.

filter_hint_cancel_flag equal to 1 may specify that the SEI message cancels the persistence of a previous post-filter hint SEI message in the output order applied to the current layer. filter_hint_cancel_flag equal to 0 may specify that post-filter hint information follows.

filter_hint_persistence_flag may specify the persistence of the post-filter hint SEI message for the current layer. filter_hint_persistence_flag equal to 0 may specify that the post-filter hint applies only to the currently decoded picture. filter_hint_persistence_flag equal to 1 may specify that the post-filter hint SEI message applies to the currently decoded picture and persists for all subsequent pictures in the current layer in output order until one or more of the following conditions are true:

A new CLVS of the current layer begins.

The bitstream ends.

A picture in the current layer of the AU associated with the post-filter hint SEI message is output after the current picture in the output order.

filter_hint_size_y may specify the vertical size of the filter coefficients or correlation array. The value of filter_hint_size_y shall be in the range of 1 to 15.

filter_hint_size_x may specify the horizontal size of the filter coefficients or correlation array. The value of filter_hint_size_x shall be in the range of 1 to 15.

filter_hint_type may specify the type of the transmitted filter hint as shown in Table 19. The value of filter_hint_type shall be in the range of 0 to 2. filter_hint_type equal to 3 is not present in the bitstream. Decoders shall ignore post-filter hint SEI messages with filter_hint_type equal to 3.

TABLE 19

| Value | Description |
|---|---|
| 0 | Coefficients of 2D-FIR filter |
| 1 | Coefficients of 1D-FIR filters |
| 2 | Cross-correlation matrix | filter_hint_chroma_coeff_present_flag equal to 1 may specify that filter coefficients for chroma are present. filter_hint_chroma_coeff_present_flag equal to 0 may specify that filter coefficients for chroma are not present. filter_hint_value[cIdx][cy][cx] may specify a filter coefficient or an element of a cross-correlation matrix between the original and the decoded signal with 16-bit precision. The value of filter_hint_value[cIdx][cy][cx] shall be in the range of $-2^{31}+1$ to $2^{31}-1$, inclusive. cIdx may specifies the related colour component, cy represents a counter in vertical direction and cx represents a counter in horizontal direction. Depending on the value of filter_hint_type, the following applies:

If filter_hint_type is equal to 0, the coefficients of a 2-dimensional finite impulse response (FIR) filter with the size of filter_hint_size_y*filter_hint_size_x may be transmitted.

Otherwise, if filter_hint_type is equal to 1, the filter coefficients of two 1-dimensional FIR filters may be transmitted. In this case, filter_hint_size_y shall be equal to 2. The index cy equal to 0 specifies the filter coefficients of the horizontal filter and cy equal to 1 specifies the filter coefficients of the vertical filter. In the filtering process, the horizontal filter is applied first and the result is filtered by the vertical filter.

Otherwise (filter_hint_type is equal to 2), the transmitted hints may specify a cross-correlation matrix between the original signal s and the decoded signal s'.

The normalized cross-correlation matrix for the relevant color components identified by cIdx of the size of filter_hint_size_y*filter_hint_size_x may be defined as in Equation 4.

$$\text{filter\_hint\_value}(cHx, cy, cx) = \frac{1}{\left(2^{8+bitDepth} - 1\right)^2 * h * w}$$
$$\sum_{m=0}^{h-1}\sum_{n=0}^{w-1} s(m, n) * s'(m + cy - \text{Offset}Y, n + cx - \text{Offset}X)$$

[Equation 4]

In Equation 4, s denotes array of samples of the colour component cIdx of the original picture, s' denotes corresponding array of the decoded picture, h denotes the vertical height of the related colour component, w denotes the horizontal width of the related colour component, bitDepth denotes the bit depth of the colour component, OffsetY is equal to (filter_hint_size_y>>1), OffsetX is equal to (filter_hint_size_x>>1), the range of cy is 0<=cy<filter_hint_size_y and the range of cx is 0<=cx<filter hint size x.

A decoder can derive a Wiener post-filter from the cross-correlation matrix of original and decoded signal and the auto-correlation matrix of the decoded signal.

Problems of the Related Art

The problems of the related art according to the present disclosure are as follows.

The NNPFC SEI message may provide a neural-network post-filter, and the NNPFA SEI message may provide activation of the post-filter specified in the NNPFC SEI message to a set of pictures. The NNPFA SEI message may specify that the target post-filter is applied only to the current picture or to the current pictures and subsequent pictures in output order until one of the following events occurs.

A new CLVS of the current layer begins.

The bitstream ends.

A picture in the current layer associated with an NNPFA SEI message with the same nnpfa_target_id as the current SEI message and nnpfa_cancel_flag equal to 1 is output after the current picture in output order.

Figure 5:
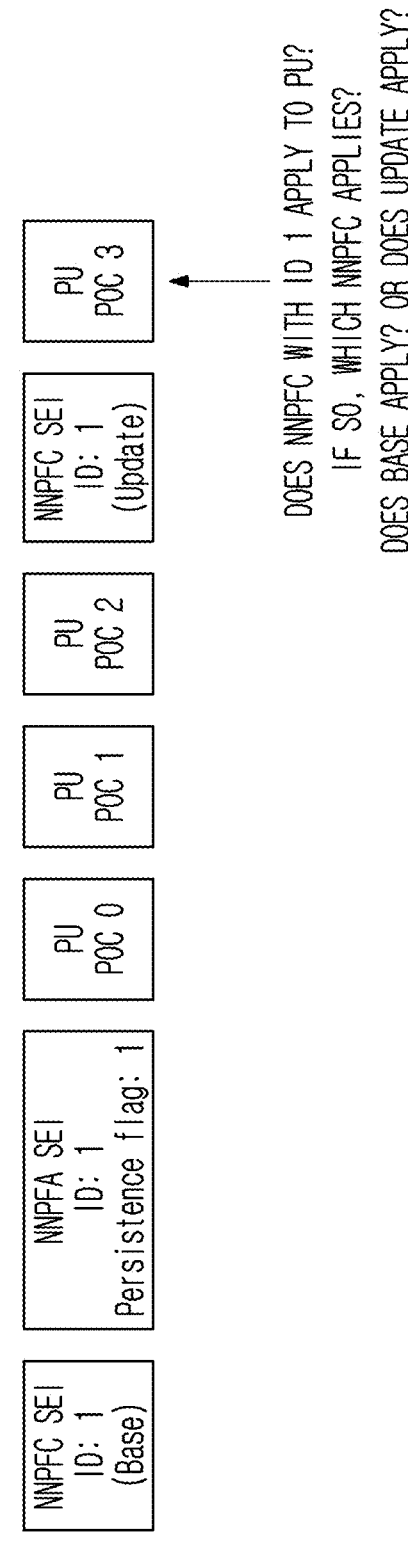
FIGS. 5 to 8 are diagrams for explaining various examples of persistence and cancellation of NNPFA.

The signaling design, including and persisting NNPFC and NNPFA, may lead to problems in situations such as those in FIG. 5. In the example of FIG. 5, a new NNPFC SEI message may be present in an AU containing a PU (picture unit) with POC 3. This may create a situation where it is unclear whether a neural-network post-filter is applied to the PU (picture unit) containing POC 3. If applied, then the NNPFC is applied after the previous NNPFA enabled the base NNPFC SEI, but the update is provided.

Figure 6:
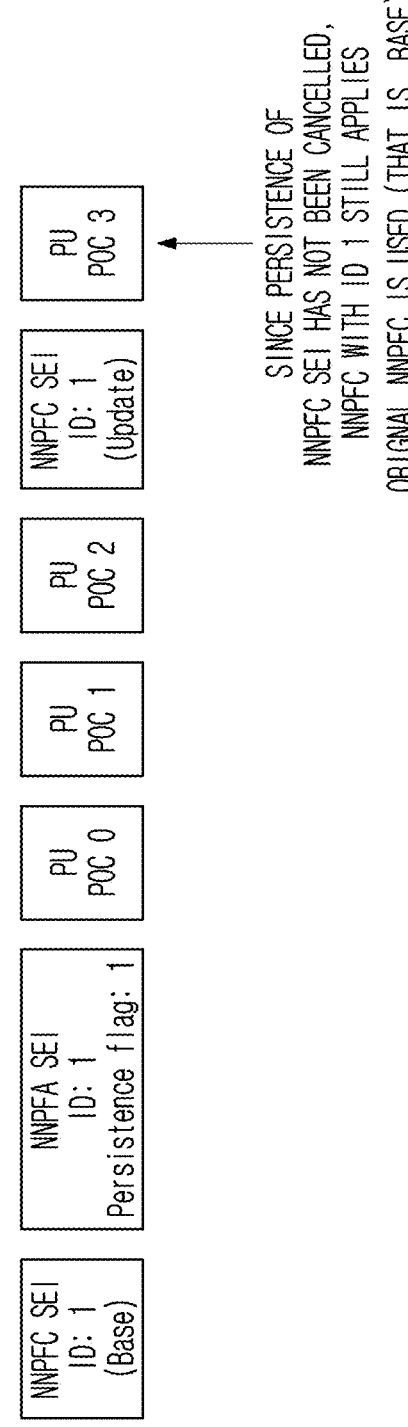

One possible solution for the problem is by specifying that the neural-network post-filter that applies to a picture is the one that is in the immediate NNPFC that precede the NNPFA in output order. As illustrated in FIG. 6, since the presence of the NNPFC SEI does not cancel the persistence of the NNPFA SEI, the NNPFC with an ID of 1 may still be applied. That is, the original (base) filter may be applied to the PU containing POC3.

The other problems of the related art according to the present disclosure are as follows. The neural-network post-filter characteristics (NNPFC) SEI message includes a flag so called nnpfc_formatting_and_purpose_flag. nnpfc_formatting_and_purpose_flag represents the presence of syntax elements related to some description which may include formatting, purpose, and/or complexity information of the filter. The presence of this flag is specified as follows:

When this SEI message is the first NNPFC SEI message, in decoding order, that has a particular nnpfc_id value within the current CLVS, nnpfc_formatting_and_purpose_flag shall be equal to 1. When this SEI message is not the first NNPFC SEI message, in decoding order, that has a particular nnpfc_id value within the current CLVS, nnpfc_formatting_and_purpose_flag shall be equal to 0.

However, the above constraint may not be necessary if the purpose of it is simply to specify the presence of the signalling of purpose and format information of the filter since it may simply be derived based on whether the SEI message with the particular nnpfc_id is the first one or not. On the other hand, if nnpfc_formatting_and_purpose_flag also has a purpose to indicate whether the SEI message contains base neural-network post-filter (NNPF), it should be designed to reflect such purpose.

The other problems of the related art according to the present disclosure are as follows.

The above constraint on nnpfc_formatting_and_purpose_flag has at least the problem such that it prohibits NNPFC SEI message that contains the base neural-network post-processing filter to be repeated. When an SEI message is repeated, usually it is constrained that the content is the same. However, the above constraint prohibits the signalling of formatting, purpose, and complexity to be present in the repeated SEI message.

Even if the above issue is fixed, regarding the repeated NNPFC SEI message, there are more problems to be solved as follows:

Problem 1. Is the repetition is allowed for NNPFC SEI message regardless the NNPFC SEI message contains a base neural-network post-processing filter or an update for the base neural-network post-processing filter? If not, which NNPFC SEI message is allowed to be repeated?

Problem 2. If the NNPFC SEI message that contains a base neural-network post-processing filter can be repeated, can it be repeated after the filter is updated by the presence of other NNPFC SEI message (i.e., that has the same nnpfc_id)?

Problem 3. If the answer to Problem 2 above is yes, when a repeated NNPFC SEI message that contains a base neural-network post-processing filter is present after another NNPFC SEI message with the same nnpfc_id that contains the update for the neural-network post-processing filter, does the repeated SEI message override the update (i.e., it cancels out the update)?

The semantics for NNPFC SEI message should clarify all the problems described above.

Embodiment

Hereinafter, NNPFC may be signaled in the form of an SEI message as the NNPFC syntax structure of Tables 1 and 2, in which case NNPFC may be an NNPFC SEI message. NNPFA may be signaled in the form of an SEI message as the NNPFA syntax structure of Table 17, in which case NNPFA may be an NNPFA SEI message. Post-filter hint may be signaled in the form of an SEI message as the post-filter hint syntax structure of Table 18, in which case the post-filter hint may be a post-filter hint SEI message.

Embodiments according to the present disclosure may include various aspects to improve some or all of the problems described above. Aspects may be applied individually or in combination of two or more.

Aspect 1: When an NNFPA SEI message pertains to the current picture, the target neural-network post-filter that applies/pertains to the current picture may be specified as the filter described/carried in the first NNPFC SEI message with the same id (e.g., nnpfc_id) that immediately precedes that NNPFA SEI message in output order.

Aspect 2: Instead of explicitly signal a flag (i.e., nnpfc_formatting_and_purpose_flag), the presence of syntax elements for purpose and format information in NNPFC SEI message may be determined based on whether the NNPFC SEI message is the first SEI message with the particular id in the CLVS.

Aspect 3: flag nnpfc_formatting_and_purpose_flag may be changed to nnpfc_base_filter_flag and the semantics of the flag may be updated such that it specifies that the SEI message carries (contains) the base neural-network post-processing filter. In this case, the flag may also specify whether the SEI message contains syntax regarding the purpose and formatting of the filter.

Aspect 4: A new flag to indicate whether the NNPFC SEI message contains the base neural-network post-filter (NNPF) may be specified. This flag may be called nnpfc_base_flag.

Aspect 5: nnpfc_base_flag may be restricted to be equal to 1 for the first NNPFC SEI message in the CLVS with a particular nnpfc_id.

Aspect 6: When an NNPFC SEI message with a particular nnpfc_id is not the first NNPFC SEI message in the CLVS and the value of nnpfc_base_flag is equal to 1, it means that the NNPFC SEI message is a repetition to the first NNPFC SEI message with that nnpfc_id. In this case, the repeated NNPFC SEI message shall have the same content as the first NNPFC SEI message.

Aspect 7: The presence of nnpfc_base_flag may be conditioned upon the value of nnpfc_formatting_and_purpose_flag. When not present, the value of nnpfc_base_flag may be inferred to be equal to 0.

In the present disclosure, nnpfc_base_flag having a value of "1" may mean that the NNPFC SEI message includes a base NNPF. In the present disclosure, nnpfc_base_flag having a value of "0" may mean that the NNPFC SEI message does not include a base NNPF.

With reference to Table 1, Table 2, and Table 17, the NNPFC syntax structure and semantics, the NNPFA syntax structure and semantics are described.

According to the present disclosure, at least some of the above-described problems can be solved by improving at least some of the above-described NNPFC syntax structure and semantics, NNPFA syntax structure and semantics by taking into consideration at least some of Aspects 1 to 7 above.

Embodiment 1

Embodiment 1 of the present disclosure pertains to Aspect 1 above. According to Embodiment 1 of the present disclosure, when an NNPFA SEI message pertains to the current picture, the target neural-network post-processing filter for the current picture may be specified as the filter that is provided in the first NNPFC SEI message that immediately precedes that NNPFA SEI message, in output order, and with nnpfc_id equal to nnpfa_target_id.

Figure 7:
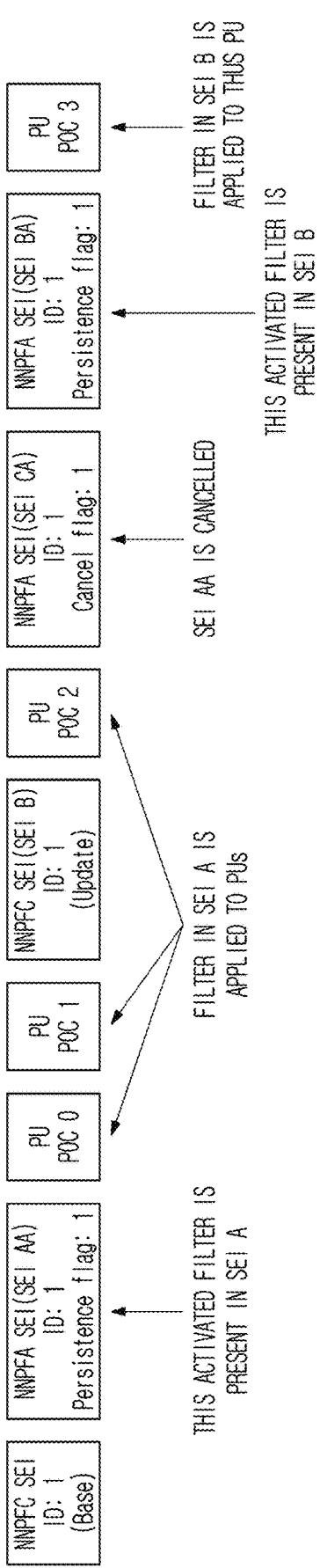

FIG. 7 illustrates the activations of neural-network post-processing filters that show which filter applies to which picture. As shown in FIG. 7, for PU with POC 2, the neural-network post-processing filter that is used is still the filter in SEI A even though an update filter is present before that PU (i.e., in SEI B). This is because the filter in SEI B has not been activated yet and the last activation was by SEI AA that is associated with SEI A. The filter in SEI B is activated by NNPFA SEI BA and applies to PU with POC 3.

Figure 8:
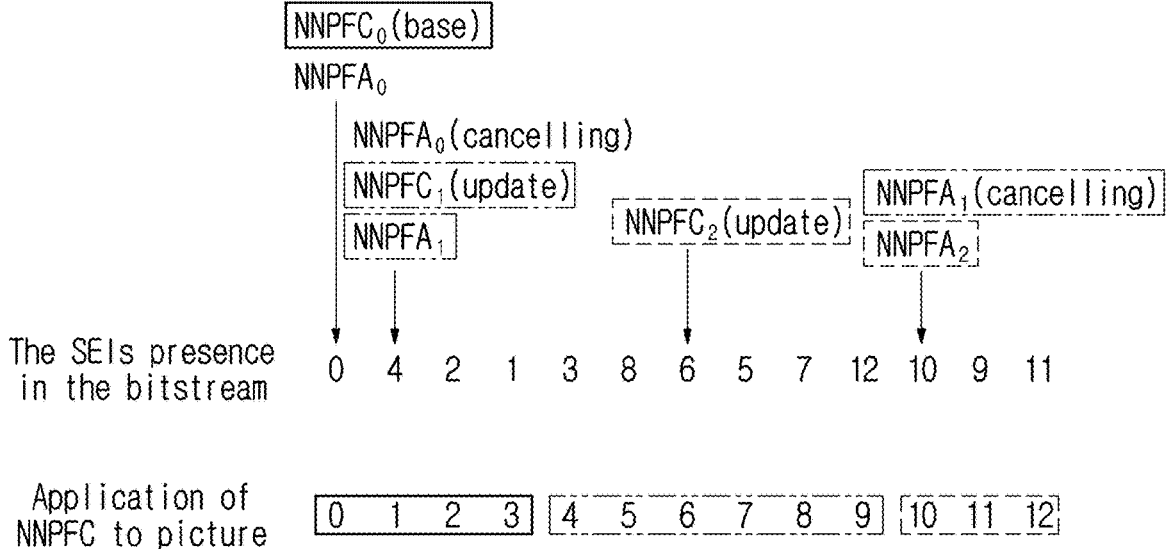

FIG. 8 illustrates the application of multiple NNPFC SEI messages with the same nnpfc_id. In FIG. 8, positions where each NNPFC SEI message is activated are different. As shown in FIG. 8, update filters may be signal when at any point and the updated filters are activated only when a new NNPFA SEI message with nnpfa_cancel_flag equal to 0 is output.

According to the present embodiment, the point in time at which the updated filter is applied may be clearly specified. Alternatively, the filter to be applied at each point in time may be clearly specified.

Embodiment 2

Embodiment 2 of the present disclosure pertains to Aspect 2 above. According to Embodiment 2 of the present disclosure, signaling of nnpfc_formatting_and_purpose_flag in the NNPFC SEI message described with reference to Table 1 may be omitted.

Additionally, in Table 1, conditional signaling based on nnpfc_formatting_and_purpose_flag may be performed based on a variable called, for example, nnpfcFormattingAndPurposePresentFlag. For example, if (nnpfc_formatting_and_purpose_flag) in Table 1 may be changed to if (nnpfcFormattingAndPurposePresentFlag). According to Embodiment 2 of the present disclosure, the relevant part of Table 1 may be changed as shown in Table 20 below.

TABLE 20

| | Descriptor |
|---|---|
| nn_post_filter_characteristics( payloadSize ) { | |
|   nnpfc_id | ue(v) |
|   ... | |
|   ~~nnpfc_formatting_and_purpose_flag~~ | u(1) |
|   if( nnpfcFormattingAndPurposePresentFlag ) | |
|   { | |
|     ... | |
|     } | |
|   } | |
|   ... | |
| } | | nnpfcFormattingAndPurposePresentFlag may be a variable, not a syntax element, and may be derived as follows:

If this SEI message is the first NNPFC SEI message, in decoding order, that has a particular nnpfc_id within the current CLVS, nnpfcFormattingAndPurposePresentFlag may be derived to be 1. Otherwise, nnpfcFormattingAndPurposePresentFlag may be derived to be 0.

According to the present embodiment, whether syntax for purpose and formatting information of a filter is present in the NNPFC SEI message may be determined without explicitly signaling the nnpfc_formatting_and_purpose_flag, thereby saving bits required for explicit signaling.

Embodiment 3

Embodiment 3 of the present disclosure pertains to Aspect 3 above. According to Embodiment 3 of the present disclosure, nnpfc_base_filter_flag may be signaled instead of nnpfc_formatting_and_purpose_flag in the NNPFC SEI message described with reference to Table 1. According to Embodiment 3 of the present disclosure, the relevant part of Table 1 may be changed as shown in Table 21 below.

TABLE 21

| | Descriptor |
|---|---|
| nn_post_filter_characteristics( payloadSize ) { | |
|   nnpfc_id | ue(v) |
|   ... | |
|   ~~nnpfc_formatting_and_purpose_flag~~ | u(1) |
|   ~~if(nnpfc_formatting_and_purpose_flag ) {~~ | — |
|   nnpfc_base_filter_flag | u(1) |
|   if(nnpfc_base_filter_flag ) { | |
|     ... | |
|   } | |
|   ... | |
| } | |

In addition, nnpfc_base_filter_flag equal to 1 may specify that this SEI message is the first NNPFC SEI message, in decoding order, that has particular nnpfc_id within the current CLVS. In addition, syntax elements related to the filter purpose, input formatting, output formatting, and complexity are present.

nnpfc_base_filter_flag equal to 0 may specify that this SEI message is not the first NNPFC SEI message, in decoding order, that has particular nnpfc_id within the current CLVS. In addition, no syntax elements related to the filter purpose, input formatting, output formatting, and complexity are present.

According to the embodiment, by signaling the nnpfc_base_filter_flag, it can be specified whether the SEI message contains information about the filter purpose, formatting and complexity, as well as whether the SEI message contains a base NNPF.

Embodiment 4

Embodiment 4 of the present disclosure pertains to at least one of Aspects 4 to 6 above. According to Embodiment 4 of the present disclosure, the NNPFC SEI message described with reference to Table 1 may include nnpfc_base_flag. According to Embodiment 4 of the present disclosure, the relevant part of Table 1 may be changed as shown in Table 22 below.

TABLE 22

| | Descriptor |
|---|---|
| nn_post_filter_characteristics( payloadSize ) { | |
|   nnpfc_id | ue(v) |
|   nnpfc_mode_idc | ue(v) |
|   if( nnpfc_mode_idc = = 1 ) { | |
|     ... | |
|   } | |
|   nnpfc_formatting_and_purpose_flag | u(1) |
|   nnpfc_base_flag | u(1) |
|   if( nnpfc_formatting_and_purpose_flag ) { | |
|     ... | |
|   } | |
|   ... | |
| } | |

According to the present embodiment, nnpfc_base_flag equal to 1 may specify that the SEI message contains the base neural-network post-filter. nnpf_base_flag equal to 0 may specify that the SEI message contains an update relative to the base neural-network post-filter. The value of nnpfc_base_flag shall be as follows:

When an NNPFC SEI message is the first NNPFC SEI message, in decoding order, that has particular nnpfc_id within the current CLVS, the value of nnpfc_base_flag may be restricted to be equal to 1

When an NNPFC SEI message nnpfcB is not the first NNPFC SEI message, in decoding order, that has particular nnpfc_id within the current CLVS and nnpfc_base_flag is equal to 1, nnpfcB is a repetition of the first NNPFC SEI message nnpfcA with the same nnpfc_id, in decoding order. In this case, the content of nnpfcB may be restricted to be the same as that of nnpfcA.

When an NNPFC SEI message is not the first NNPFC SEI message, in decoding order, that has particular nnpfc_id within the current CLVS and not a repetition of the first NNPFC SEI message with particular nnpfc_id, the following applies:

This SEI message may define an update relative to the preceding base post-processing filter in decoding order with the same nnpfc_id.

This SEI message pertains to the current decoded picture and all subsequent decoded pictures of the current layer, in output order, until the end of the current CLVS or the decoded picture that follows the current decoded picture in output order within the current CLVS. In addition, the SEI message may be associated with a subsequent NNPFC SEI message, in decoding order, having particular nnpfc_id within the current CLVS, whichever is earlier. When the value of nnpfc_formatting_and_purpose_flag is equal to 1 and nnpfc_base-flag is equal to 0, the SEI message may contain a full update relative to the NNPFC SEI message containing the base neural-network post-filter.

In addition, among aspects described with reference to Table 1, the aspect that an NNPFC SEI message is a repetition of a previous NNPFC SEI message, in decoding order, in the current CLVS, and the subsequent semantics apply as if this SEI message were the only NNPFC SEI message having the same content within the current CLVS may be omitted without applying to Embodiment 4.

According to Embodiment 4 of the present disclosure, an NNPFC SEI message containing a base neural-network post-processing filter may be repeated. In addition, the repeated NNPFC SEI may have the same content as the first NNPFC SEI message having the same nnpfc_id value, in decoding order, in the current CLVS. In addition to the above effects, it is expected that the additional problems of the above-described related art are solved.

Embodiment 5

Embodiment 5 of the present disclosure pertains to at least one of Aspects 4 to 7 above. According to Embodiment 5 of the present disclosure, the NNPFC SEI message described with reference to Table 1 may include nnpfc_base_flag. In addition, nnpfc_base_flag may be conditionally signaled according to nnpfc_formatting_and_purpose_flag. According to Embodiment 5 of the present disclosure, the relevant part of Table 1 may be changed as shown in Table 23 below.

TABLE 23

| | Descriptor |
|---|---|
| nn_post_filter_characteristics( payloadSize ) { | |
|   nnpfc_id | ue(v) |
|   nnpfc_mode_idc | ne(v) |
|   if( nnpfc_mode_idc = = 1 ) { | |
|     ... | |
|   } | |
|   nnpfc_formatting_and_purpose_flag | u(1) |
|   if( nnpfc_formatting_and_purpose_flag ) { | |
|     nnpfc_base_flag | u(1) |
|     ... | |
|   } | |
|   ... | |
| } | |

Embodiment 5 of the present disclosure differs in that nnpfc_base_flag may be conditionally signaled depending on nnpfc_formatting_and_purpose_flag. Therefore, the description of Embodiment 4 may be equally applied to Embodiment 5. However, nnpfc_base_flag may not be signaled based on nnpfc_formatting_and_purpose_flag being 0. If nnpfc_base_flag is not present, nnpfc_base_flag may be inferred to be a value of "0".

According to embodiment 5 of the present disclosure, the effect according to embodiment 4 may be expected. Furthermore, when nnpfc_formatting_and_purpose_flag is 0, the bits required for signaling nnpfc_base_flag can be saved by omitting the signaling of nnpfc_base_flag.

Hereinafter, an image encoding method and an image decoding method according to various embodiments of the present invention will be described. The image encoding method of FIG. 9 may be performed by the image encoding apparatus 100, and the image decoding method of FIG. 10 may be performed by the image decoding apparatus 200.

Figure 9:
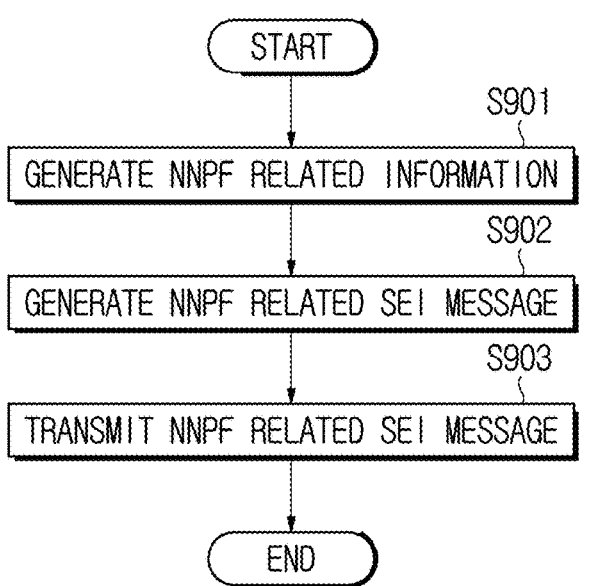
FIG. 9 is a flowchart for explaining an image encoding method to which an embodiment according to the present disclosure is applicable.

Referring to FIG. 9, the image encoding apparatus may generate NNPF (Neural-network post-filter) related information regarding a neural-network post-processing filter to be applied to a current picture (S901). The image encoding apparatus may encode the generated NNPF related information to generate an NNPF (Neural-network post-filter) related SEI message (S902). The image encoding apparatus may transmit the generated NNPF related SEI message to, for example, the image decoding apparatus (S903). The image encoding apparatus performs steps S901 and S902, and step S903 may be a part of a transmission method performed by a separate transmission apparatus.

Figure 10:
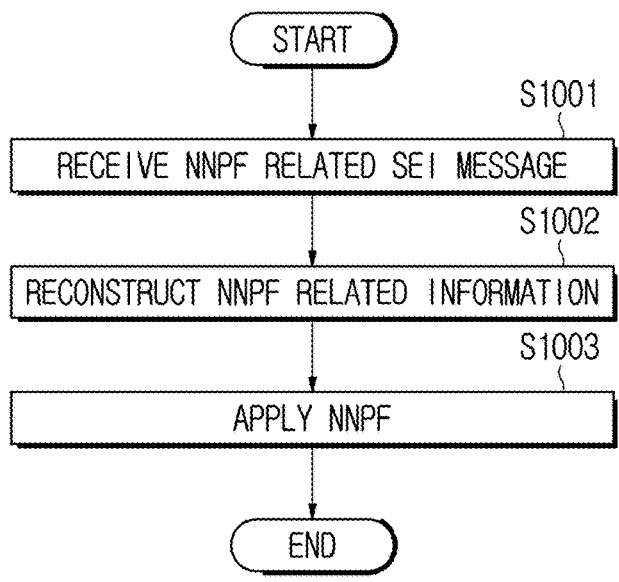
FIG. 10 is a flowchart for explaining an image decoding method to which an embodiment according to the present disclosure is applicable.

Referring to FIG. 10, the image decoding apparatus may receive the NNPF-related SEI message regarding the neural-network post-processing filter to be applied to the current picture (S1001). The image decoding apparatus may decode the received NNPF-related SEI message to reconstruct NNPF-related information (S1002). The image decoding apparatus may apply NNPF to the current picture based on the reconstructed NNPF-related information (S1003). Steps S1002 and S1003 above may be performed on the condition that NNPF is applied to the current picture.

In the description with reference to FIGS. 9 and 10, the NNPF-related SEI message may include an NNPFC SEI message, an NNPFA SEI message, and/or an SEI message regarding a post-filter hint according to the present disclosure. In addition, the NNPF-related information may mean information signaled by syntax elements included in the NNPF-related SEI message.

As described above, the NNPFC SEI message may include syntax elements such as nnpfc_id, nnpfc_formatting_and_purpose_flag, etc. nnpfc_id is to identify a post-processing filter and may be expressed as "filter identification information." nnpfc_formatting_and_purpose_flag specifies whether syntax elements related to filter properties such as filter purpose, input formatting, output formatting, and/or complexity are present and may be expressed as "filter property present information." In addition, nnpfc_base_flag is information specifying whether the SEI message includes a base neural-network post-processing filter and may be expressed as "base filter present information."

Embodiments according to the present disclosure and aspects according to the present disclosure regarding the above NNPFC SEI message may be applied to the image encoding method and/or the image decoding method according to the present disclosure described with reference to FIGS. 9 and 10.

Specifically, in the image encoding method and/or image decoding method according to the present disclosure, the NNPF-related SEI message includes a neural-network post-filter characteristics (NNPFC) SEI message including filter identification information and filter property present information, and the NNPFC SEI message may further include base filter present information specifying whether the NNPFC SEI message includes a base neural-network post-processing filter.

In addition, in the image encoding method and/or image decoding method according to the present disclosure, based on the base filter present information having a first value, the NNPFC SEI message may include the base neural-network post-processing filter, and based on the base filter present information having a second value, the NNPFC SEI message may include an update relative to the base neural-network post-processing filter.

In addition, in the image encoding method and/or the image decoding method according to the present disclosure, the base filter present information may be restricted to have a first value based on the NNPFC SEI message being the first NNPFC SEI message, in decoding order, that has particular filter identification information within the current CLVS (coded layer video sequence).

In addition, in the image encoding method and/or image decoding method according to the present disclosure, based on the NNPFC SEI message being not the first NNPFC SEI message, in decoding order, having particular filter identification information within the current CLVS and the base filter present information having a first value, the NNPFC SEI message may be a repetition of the first NNPFC SEI message having the same filter identification information in decoding order.

In addition, in the image encoding method and/or image decoding method according to the present disclosure, the content of the NNPFC SEI message may be restricted to be the same as that of the first NNPFC SEI message.

In addition, in the image encoding method and/or image decoding method according to the present disclosure, based on the NNPFC SEI message being not the first NNPFC SEI message, in decoding order, having particular filter identification information within the current CLVS and being not a repetition of the first NNPFC SEI message, the NNPFC SEI message may be an update relative to a preceding base post-processing filter having the same filter identification information in decoding order.

In addition, in the image encoding method and/or image decoding method according to the present disclosure, based on the filter property present information having a first value and the base filter present information having a second value, the NNPFC SEI message may include a full update relative to the NNPFC SEI message including the base neural-network post-processing filter.

In addition, in the image encoding method and/or image decoding method according to the present disclosure, the base filter present information may be included in the NNPFC SEI message based on the filter property present information.

For example, the base filter present information may be included in the NNPFC SEI message based on the filter property present information having a first value.

Alternatively, for example, the base filter present information may not be included in the NNPFC SEI message based on the filter property present information having a second value.

Alternatively, for example, the base filter present information may be derived to be a second value based on the filter property present information having a second value.

In addition, the bitstream generated by the image encoding method according to the present disclosure may be stored in a non-transitory computer-readable recording medium.

In addition, the bitstream generated by the image encoding method according to the present disclosure may be transmitted to, for example, the image decoding apparatus.

According to an embodiment of the present disclosure, the NNPFC SEI message including the base neural-network post-processing filter may be repeated. In addition, the repeated NNPFC SEI may have the same content as the first NNPFC SEI message having the same filter identification information in the current CLVS in decoding order. In addition, when the filter property present information is a second value, signaling of the base filter present information may be omitted, thereby saving bits. Including the above effect, it is expected that the additional problems of the above-described related art are solved.

In the present disclosure, the filter property present information and the base filter present information may have a first value or a second value. The first value may mean 1 or "true". The second value may mean 0 or "false".

Figure 11:
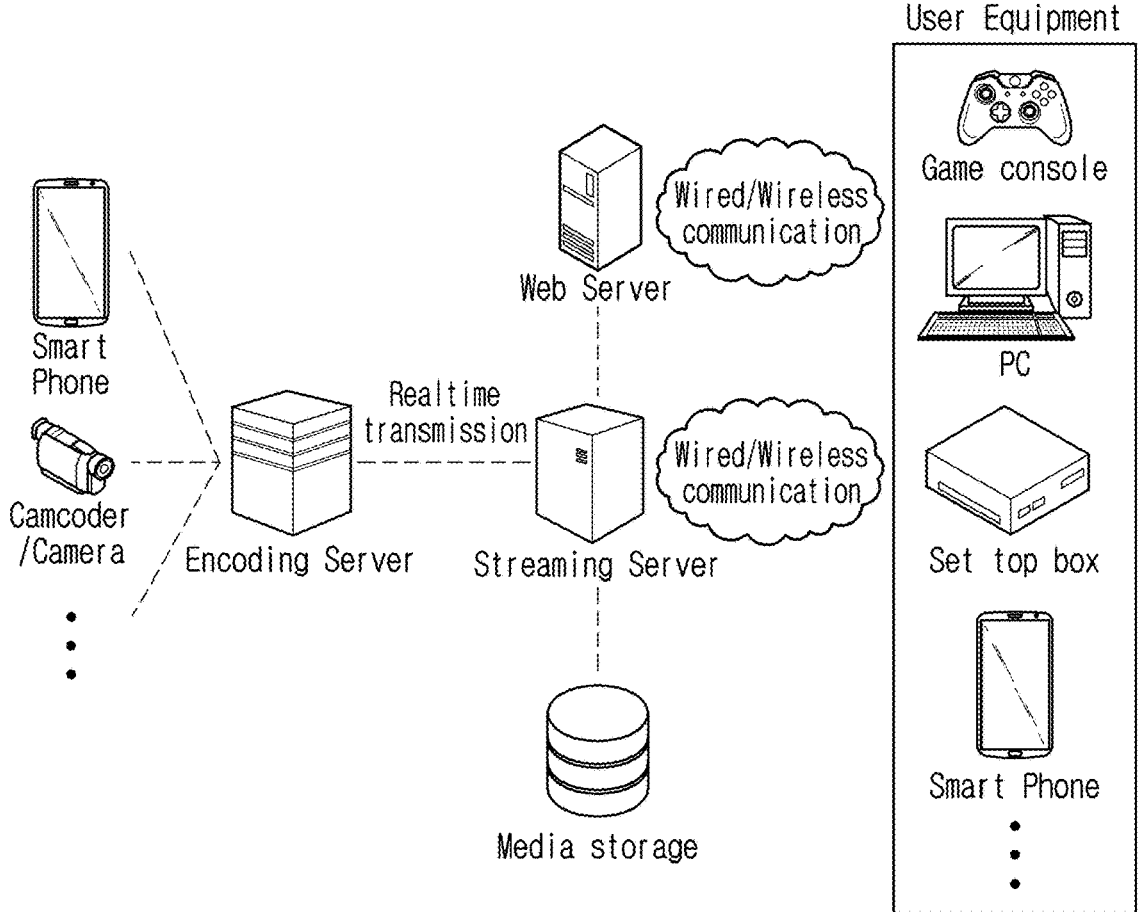
FIG. 11 is a view showing a content streaming system to which an embodiment of the present disclosure is applicable.

FIG. 11 is a view showing a content streaming system, to which an embodiment of the present disclosure is applicable.

As shown in FIG. 11, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. An image decoding method performed by an image decoding apparatus, the image decoding method comprising:

receiving a neural-network post-filter (NNPF) related supplemental enhancement information (SEI) message;

decoding the NNPF related SEI message; and applying an NNPF to a current picture based on the NNPF related SEI message, wherein the NNPF related SEI message includes a neural-network post-filter characteristics (NNPFC) SEI message including filter identification information and filter property present information, wherein the NNPFC SEI message further includes base filter present information specifying whether the NNPFC SEI message specifies a base neural-network post-processing filter, wherein based on the base filter present information having a first value of 1, the NNPFC SEI message specifies the base neural-network post-processing filter, and wherein based on the base filter present information having a second value of 0, the NNPFC SEI message specifies an update relative to the base neural-network post-processing filter.

2. The image decoding method of claim 1, wherein based on the NNPFC SEI message being a first NNPFC SEI message, in decoding order, having particular filter identification information within a current coded layer video sequence (CLVS), the base filter present information is restricted to have a first value.

3. The image decoding method of claim 1, wherein based on the NNPFC SEI message being not a first NNPFC SEI message, in decoding order, having particular filter identification information within a current CLVS and the base filter present information having a first value, the NNPFC SEI message is a repetition of the first NNPFC SEI message in decoding order with the same filter identification information.

4. The image decoding method of claim 3, wherein the content of the NNPFC SEI message is restricted to be the same as that of the first NNPFC SEI message.

5. The image decoding method of claim 1, wherein based on the NNPFC SEI message being not a first NNPFC SEI message, in decoding order, having particular filter identification information within a current CLVS and being not a repetition of the first NNPFC SEI message, the NNPFC SEI message may be an update relative to a preceding base post-processing filter in decoding order with the same filter identification information.

6. The image decoding method of claim 1, wherein based on the filter property present information having a first value and the base filter present information having a second value, the NNPFC SEI message includes a full update relative to the NNPFC SEI message including the base neural-network post-processing filter.

7. The image decoding method of claim 1, wherein the base filter present information is included in the NNPFC SEI message based on the filter property present information.

8. The image decoding method of claim 7, wherein the base filter present information is included in the NNPFC SEI message based on the filter property present information having a first value.

9. The image decoding method of claim 7, wherein the base filter present information is not included in the NNPFC SEI message based on the filter property present information having a second value.

10. The image decoding method of claim 9, wherein the base filter present information is derived to be a second value based on the filter property present information having a second value.

11. An image encoding method performed by an image encoding apparatus, the image encoding method comprising:

generating a neural-network post-filter (NNPF) related supplemental enhancement information (SEI) message; and encoding the NNPF related SEI message, wherein the NNPF related SEI message includes a neural-network post-filter characteristics (NNPFC) SEI message including filter identification information and filter property present information, wherein the NNPFC SEI message further includes base filter present information specifying whether the NNPFC SEI message specifies a base neural-network post-processing filter, wherein based on the base filter present information having a first value of 1, the NNPFC SEI message specifies the base neural-network post-processing filter, and wherein based on the base filter present information having a second value of 0, the NNPFC SEI message specifies an update relative to the base neural-network post-processing filter.

12. A non-transitory computer-readable recording medium storing instructions, based on being executed by a processor, cause the processor to perform operations comprising:

generating a neural-network post-filter (NNPF) related supplemental enhancement information (SEI) message; and encoding the NNPF related SEI message, wherein the NNPF related SEI message includes a neural-network post-filter characteristics (NNPFC) SEI message including filter identification information and filter property present information, wherein the NNPFC SEI message further includes base filter present information specifying whether the NNPFC SEI message specifies a base neural-network post-processing filter, wherein based on the base filter present information having a first value of 1, the NNPFC SEI message specifies the base neural-network post-processing filter, and wherein based on the base filter present information having a second value of 0, the NNPFC SEI message specifies an update relative to the base neural-network post-processing filter.

* * * * *